(12) United States Patent
Takeda

(10) Patent No.: US 6,259,498 B1
(45) Date of Patent: Jul. 10, 2001

(54) DISPLAY DEVICE

(75) Inventor: Toshihiko Takeda, Atsugi (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/472,888

(22) Filed: Dec. 28, 1999

(30) Foreign Application Priority Data

Dec. 28, 1998 (JP) .................................................. 10-374106
Jan. 25, 1999 (JP) .................................................. 11-015466
Jan. 25, 1999 (JP) .................................................. 11-015467
Jul. 2, 1999 (JP) .................................................. 11-189649

(51) Int. Cl.[7] .......................... G02F 1/1333; C09K 19/60; G09G 5/00
(52) U.S. Cl. ................................. 349/84; 349/86; 349/33; 349/166; 345/211
(58) Field of Search .................... 349/86, 84, 92, 349/94, 33, 166; 345/211

(56) References Cited

U.S. PATENT DOCUMENTS

| | | | |
|---|---|---|---|
| 3,655,267 | * 4/1972 | Forlini | 350/150 |
| 3,960,439 | 6/1976 | Becker et al. | 350/160 LC |
| 5,048,932 | 9/1991 | Yamamoto et al. | 359/48 |
| 5,253,090 | * 10/1993 | Yamazaki et al. | 359/52 |
| 5,621,552 | * 4/1997 | Coates et al. | 349/86 |
| 5,729,320 | * 3/1998 | Eidenschink et al. | 349/166 |
| 5,764,402 | * 6/1998 | Thomas et al. | 359/272 |
| 5,976,640 | * 11/1999 | Yu et al. | 428/1.1 |

FOREIGN PATENT DOCUMENTS

| | | |
|---|---|---|
| 40 41 682 | 6/1992 | (DE) . |
| 0 709 713 | 5/1996 | (EP) . |
| 0 782 123 | 7/1997 | (EP) . |
| 5-61021 | 3/1993 | (JP) . |
| 7-318982 | 12/1995 | (JP) . |
| 8-269453 | 10/1996 | (JP) . |

* cited by examiner

Primary Examiner—Kenneth Parker
Assistant Examiner—Mike Qi
(74) Attorney, Agent, or Firm—Fitzpatrick, Cella, Harper & Scinto

(57) ABSTRACT

A display device capable of causing a reversible transition between two states by only electrical stimulation is provided. The display device includes a pair of oppositely disposed substrates each having an opposing electrode thereon so as to form a hollow cell including a gap between the electrodes, a mixture disposed to fill the hollow cell and comprising a low-molecular weight liquid crystal and minute solid particles having sizes smaller than the gap, and voltage application means for applying voltages between the opposing electrodes so as to selectively provide a state of localization and a state of dispersion of the minute solid particles between the oppositely disposed substrates thereby developing a transparent state and an opaque state, respectively, of the mixture.

42 Claims, 18 Drawing Sheets

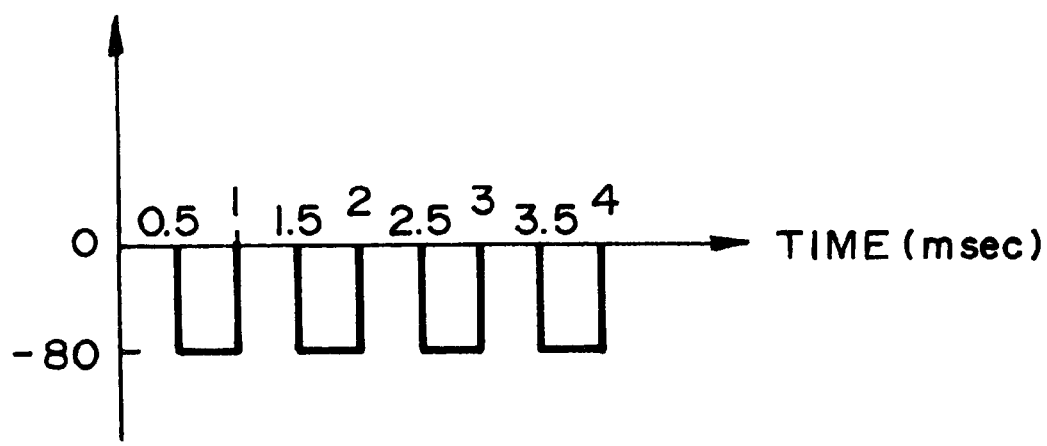
F I G. 8
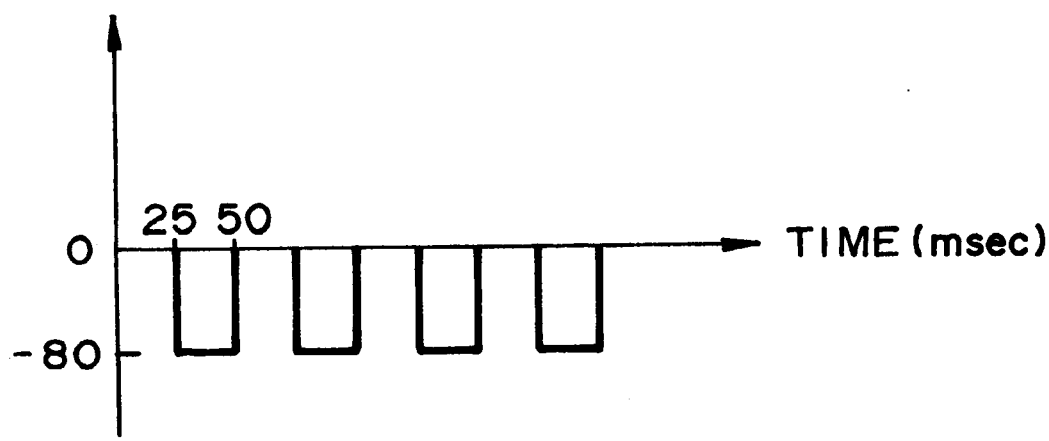
F I G. 9

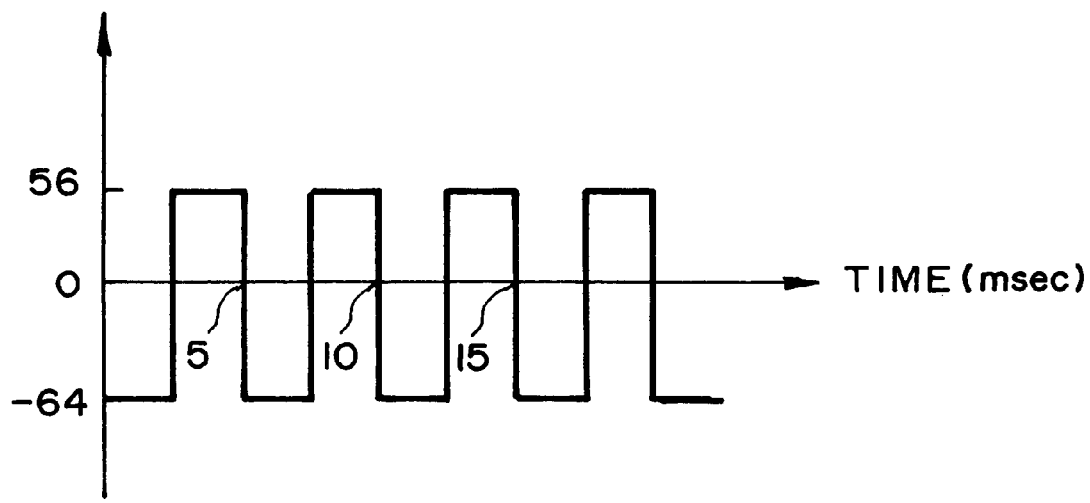
F I G. 12A
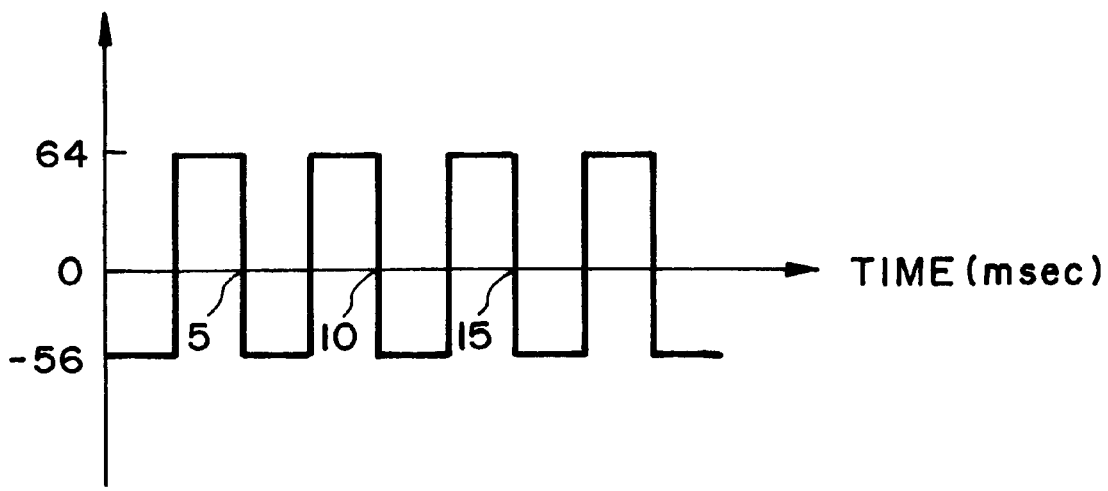
F I G. 12B

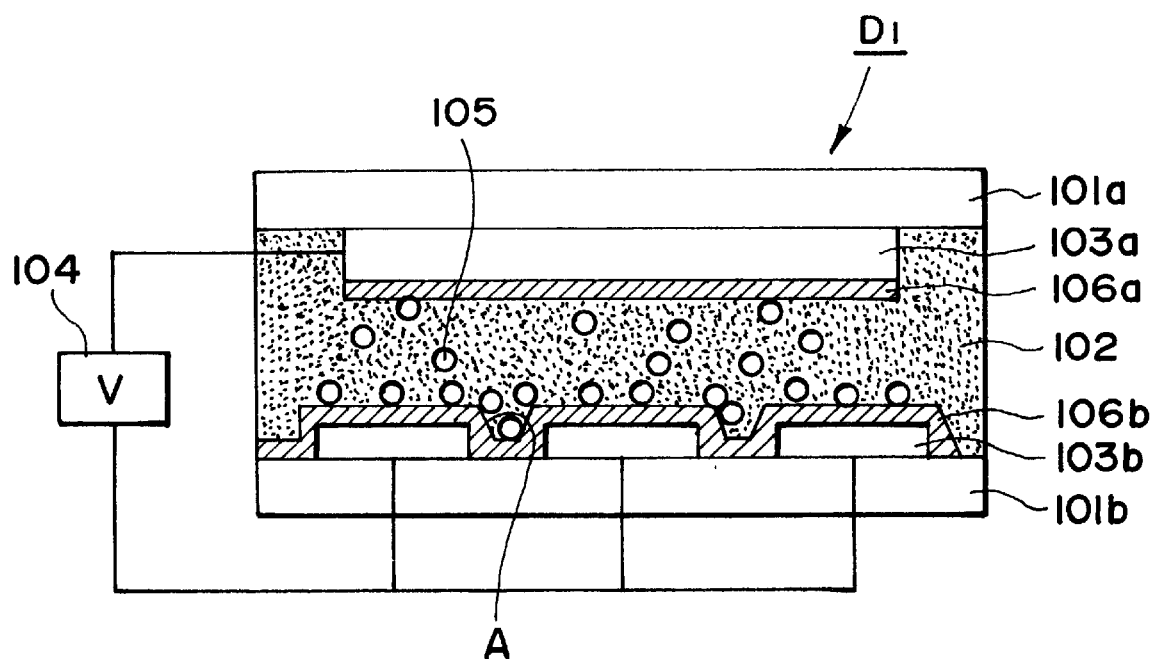
F I G. 13A
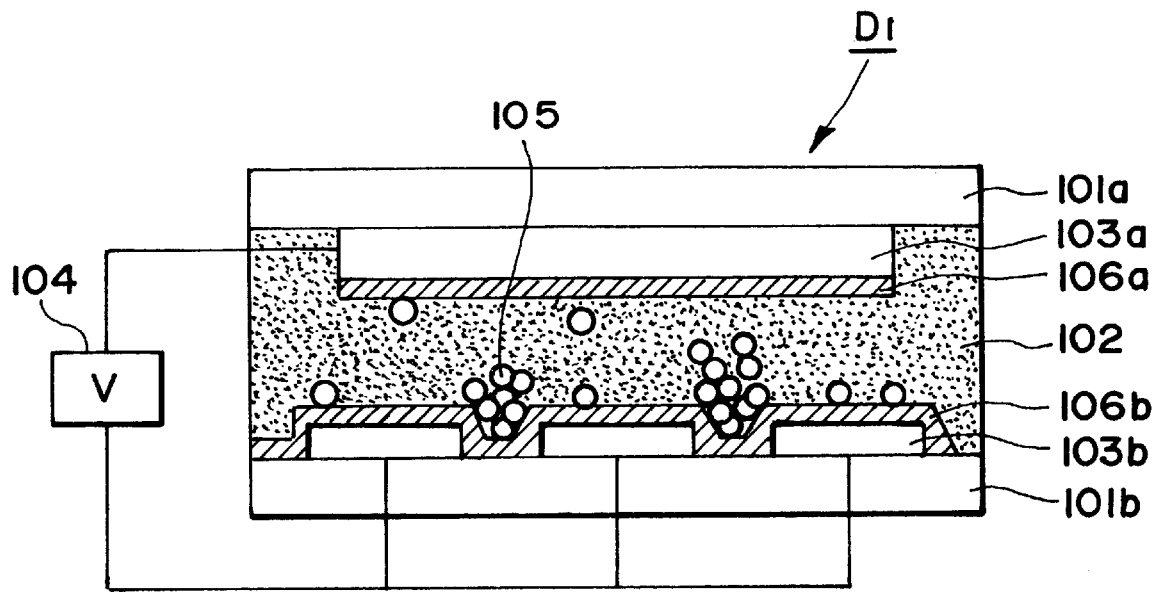
F I G. 13B

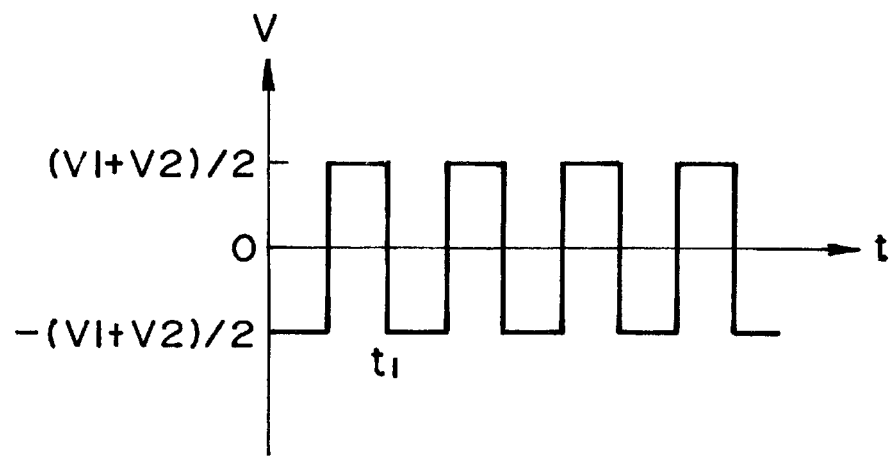
F I G. 18
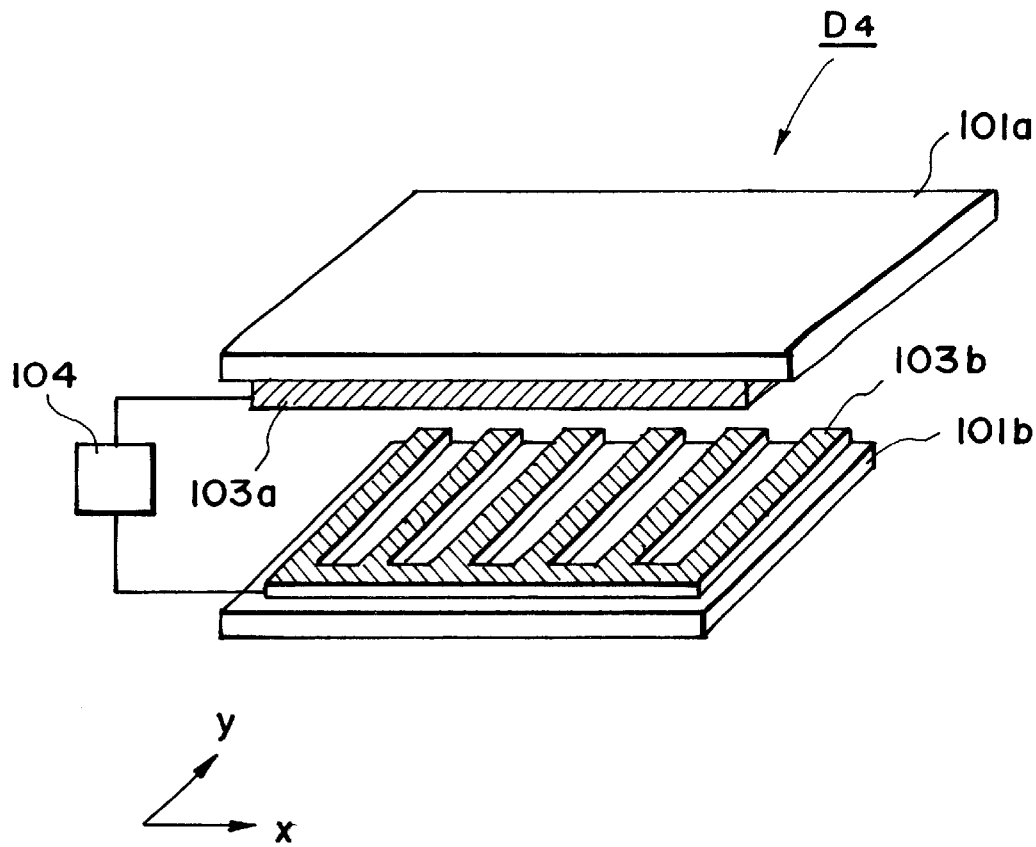
F I G. 19

DISPLAY DEVICE

FIELD OF THE INVENTION AND RELATED ART

The present invention relates to a display device using a mixture of a liquid crystal and minute solid particles.

Accompanying the progress of data processing apparatus, there has been an increasing demand for display devices requiring only a small power consumption and having a small thickness. Among such display devices, extensive study and development have been made on liquid crystal display devices as a type of display device satisfying such a demand. Particularly, display devices using a low-molecular weight liquid crystal have been commercialized and come into wide use in the society. A low-molecular weight liquid crystal allows an easy control of molecular orientation electrically but generally lacks a memory characteristic, i.e., a property of retaining its molecular orientation even after removal of a voltage applied thereto. Accordingly, for a continuous picture display, power supply to the liquid crystal cannot be interrupted, so that it is difficult to substantially suppress the power consumption.

For solving the above-mentioned problem, a number of new type liquid crystal display devices using a low-molecular weight liquid crystal and yet capable of exhibiting a memory characteristic have been proposed.

For example, Japanese Laid-Open Patent Application (JP-A) 5-61021 has proposed an electric field control of orientation state of nematic liquid crystal molecules around minute particles to realize a transparent state and a light scattering state. In this system, no alignment film or rubbing thereof is used for facilitating the control of alignment or orientation of nematic liquid crystal molecules. In this system, no change in distribution of minute particles in a direction of extension of electrodes is utilized. The system uses a nematic liquid crystal so that a substantial memory characteristic is not imparted and a continual voltage supply is required for maintaining a display state, thus requiring a substantial power consumption.

JP-A 8-269453 has proposed an electric field control according to a double frequency drive mode of a mixture of a liquid crystal exhibiting a positive or a negative dielectric anisotropy depending on a drive frequency region and flat-shaped minute particles showing affinity to the liquid crystal, to realize a transparent state and a light-scattering state. Also in this system, no alignment film or rubbing thereof is used for facilitating the control of alignment or orientation of nematic liquid crystal molecules. In this system, no change in distribution of minute particles in a direction of extension of electrodes is utilized. The system is restricted to the use of a specific liquid crystal composition, and therefor the latitude of material selection is narrow. As special minute particles requiring chemical treatments for providing the affinity and conversion into a flat shape in order to impart a memory characteristic are used, the production cost is increased.

JP-A 7-318982 also discloses a display device using a liquid crystal composition comprising a low-molecular weight liquid crystal and flat-shaped particles exhibiting affinity to the liquid crystal. When supplied with a voltage of several tens volt, the liquid crystal composition assumes a state of transmittance different from that before the voltage supply. The resultant state is retained even after removal of the voltage, so that the liquid crystal composition using a low-molecular weight liquid crystal is allowed to exhibit a memory characteristic. However, this system does not utilize a change in distribution of minute particles in a direction of electrodes. No alignment film or rubbing thereof is used for facilitating control of alignment or orientation of liquid crystal molecules.

Moreover, the above-proposed system involves a problem that a reversible change in transmittance cannot be realized only by electrical stimulation. More specifically, in order to remove a memory state formed by voltage application, it is necessary to impart a stimulation or external force other than an electric field to the liquid crystal composition. Two types of stimulation other than electric field are disclosed. One is heating of the liquid crystal composition for converting the liquid crystal composition into isotopic liquid, thereby destroying the liquid crystal texture formed by voltage application. The other is application of a mechanical stimulation, such as shearing, vibration or impact, for destroying the liquid crystal texture formed by voltage application.

SUMMARY OF THE INVENTION

In view of the above-mentioned problems of the prior art, an object of the present invention is to provide a display device using a low-molecular weight liquid crystal capable of causing a transition between two states having a memory characteristic only by application of electrical stimulation.

According to the present invention, there is provided a display device, comprising: a pair of oppositely disposed substrates each having an opposing electrode thereon so as to form a hollow cell including a gap between the electrodes, a mixture disposed to fill the hollow cell and comprising a low-molecular weight liquid crystal and minute solid particles having sizes smaller than the gap, and voltage application means for applying voltages between the opposing electrodes so as to selectively provide a state of localization and a state of dispersion of the minute solid particles between the oppositely disposed substrates thereby developing a transparent state and an opaque state, respectively, of the mixture.

These and other objects, features and advantages of the present invention will become more apparent upon a consideration of the following description of the preferred embodiments of the present invention taken in conjunction with the accompanying drawings.

BRIEF DESCRIPTION OF THE DRAWINGS

FIGS. 7–9 show pulse voltages used for driving the devices of Examples 1 and 2.

FIGS. 12A and 12B are drive voltage waveforms used for driving the device of Example 3.

FIGS. 13A and 13B are sectional views for illustrating the structure and dispersion states of minute particles in an example display device according to the invention.

FIG. 18 shows a balance AC voltage for providing unbalanced alternating voltages shown in FIGS. 17A–17C by superposition with various levels of offset voltages.

FIG. 19 is a perspective view for illustrating still another example display device.

DESCRIPTION OF THE PREFERRED EMBODIMENTS (1) First Embodiment

The minute solid particles are required to be not soluble in a liquid crystal used in combination therewith at an isotropic liquid transition temperature (above which the liquid crystal assumes an isotropic liquid state) of the liquid crystal or therebelow. The minute solid particles are also required to have sizes smaller than a gap between electrodes on both substrates. It is also required that even if the sizes of the minute particles are enlarged to some extent, e.g., by absorption of the liquid crystal or chemical reaction, the enlarged size should not exceed the gap between the electrodes. The size requirement is to be satisfied so as not to hinder the movement of the solid particles in a direction of or parallel to the planar extension of the electrodes. The movement in this direction of the solid particles is hereinafter sometimes referred to as horizontal movement. If these requirements are satisfied, the material of the solid particles need not be particularly restricted, and examples thereof may include polymer beads of, e.g., polymerized divinylbenzene, metal oxide particles, and aggregates of organic molecules. The shapes thereof are also not particularly limited but can be spherical, flat or disk-shaped, acicular, etc. However, it is desired that the size and the shape of the minute solid particles are as uniform as possible within a cell or device concerned.

The blend ratio between liquid crystal and the minute solid particles is not particularly limited as far as a desirable light-scattering or opaque state can be performed, but it is generally preferred that the solid particles are contained in a proportion of 1–90 wt. %, more preferably 2–80 wt. %, in the mixture.

The type or structure of the low-molecular weight or non-polymeric liquid crystal used in the present invention are not particularly restricted, but it is preferred that the liquid crystal exhibits a nematic phase at least within an expected operation temperature range of the display device. It is possible to use a mixture of two or more species of liquid crystal for this purpose.

The use of a low-molecular weight or non-polymeric liquid crystal is preferred because it provides a viscosity suitable for movement of the minute solid particles. In case where a polymeric liquid crystal comprising a plurality of mesogens (each having a structure similar to a low-molecular weight liquid crystal molecule) bonded via a (cross-)linking unit, the viscosity is liable to be excessively high, thus hindering the movement of the minute solid particles.

Figure 2:
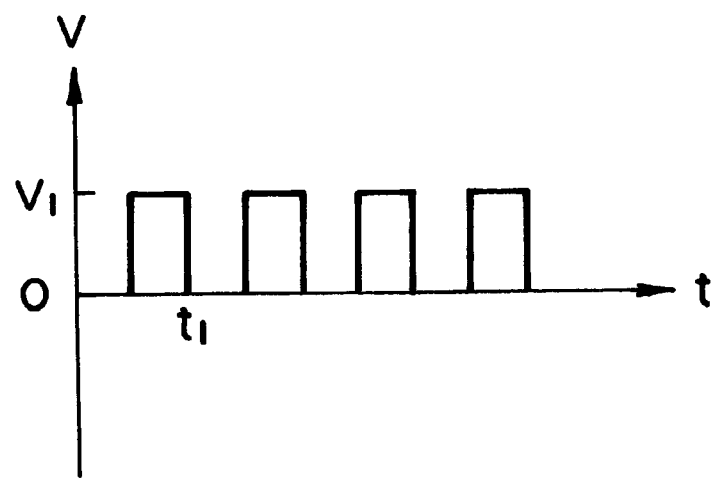
FIGS. 2–4 illustrate some examples of drive signal waveforms for a display device.
Figure 3:
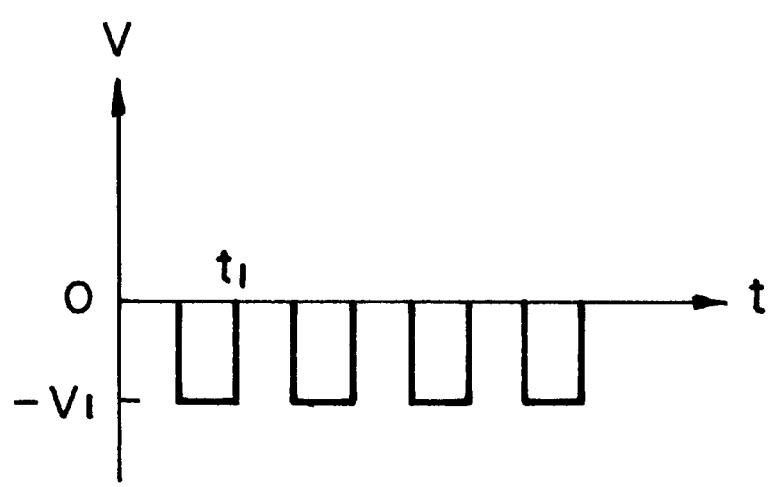

Next, the display principle of the display device is described. The principle of the display is to utilize a phenomenon that when a voltage is applied between the electrodes sandwiching the mixture of the liquid crystal and the minute solid particles, the solid particles are moved in a direction parallel to the substrates (i.e., causes a horizontal movement). The phenomenon is explained with reference to FIGS. 1 to 3 wherein FIG. 1 is a schematic illustration of an embodiment of the display device according to the present invention and FIGS. 2 and 3 illustrate drive signal waveforms for driving the display device.

Figure 1:
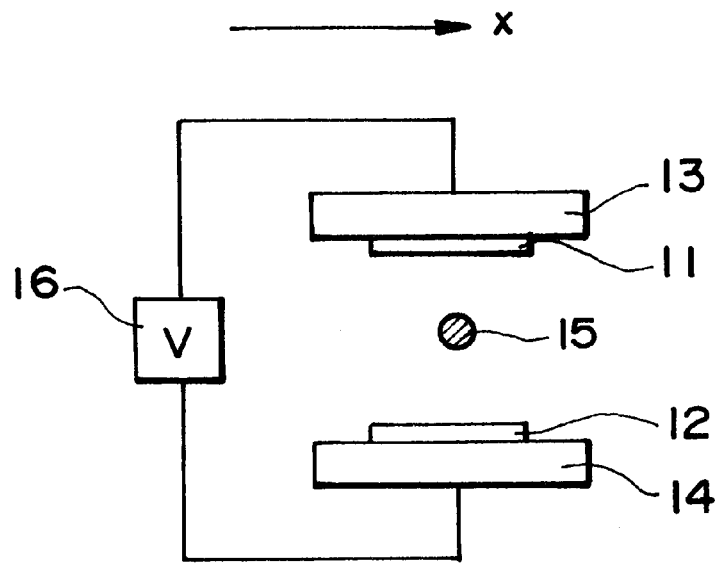
FIG. 1 is a schematic side illustration of a display device according to the invention.

Referring to FIG. 1, the device includes a pair of electrodes 11 and 12 disposed on substrates 13 and 14, respectively. Between the electrodes 11 and 12, a mixture including a liquid crystal and minute solid particles 15 (only one being shown) of polymer beads or silica beads is disposed. In FIG. 1, the liquid crystal and the spacer are omitted from showing. The device further includes a voltage application means 16 for applying voltages between the electrodes 11 and 12. The electrodes 11 and 12 are assumed to have been rubbed in directions of +x and −x, respectively.

When rectangular wave voltages (cycle: t1 and amplitude: V1) of a simple polarity (positive) as shown in FIG. 2 are applied between the electrodes 11 and 12 (more specifically +V1 to the electrode 12) from the voltage application means, the minute solid particles are moved in one direction of +x-axis. On the other hand, rectangular wave voltages (cycle: t1, amplitude: −V1) of a negative polarity are applied between the electrodes 1 and 12 (−V1 to 12), the minute solid particle are moved in the −x-axis direction.

Thus, the solid particles 15 are unidirectionally moved in one of two directions which are opposite to each other depending on whether a positive or a negative rectangular wave is applied.

When voltages as shown in FIGS. 2 and 3 are terminated, the unidirectional movement of the minute solid particles is stopped, and the minute solid particles stay at the position, thus showing a memory characteristic.

Figure 4:
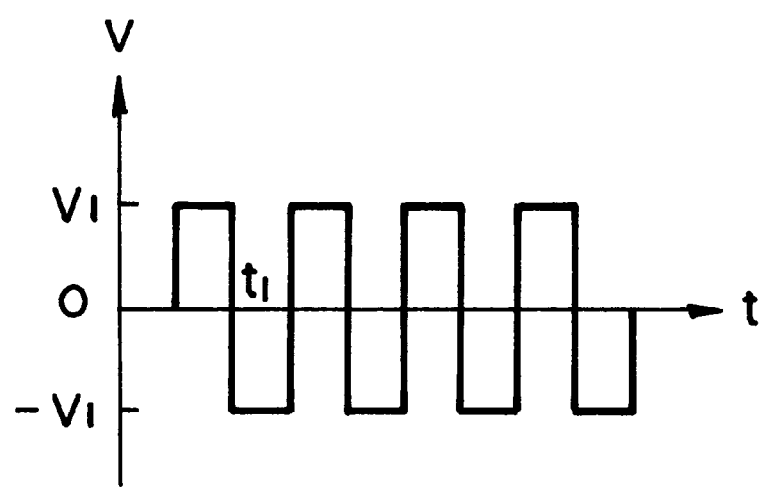

Moreover, when two-polarity rectangular voltages as shown in FIG. 4 are applied from the voltage application means, the minute solid particles 15 do not move but remain at the position.

The above-mentioned unidirectional movement of minute solid particles is not caused only by applying arbitrary voltages of a single polarity. More specifically, a certain threshold is present regarding a frequency and an amplitude of (rectangular) voltages of a single polarity for causing such a unidirectional movement of minute solid particles.

This is assumed to be related with the kinetics of unidirectional movement of minute solid particles. The kinetics of minute solid particles have not been clarified as yet, but it is assumed possible that the movement is related with a back flow of a nematic liquid crystal (liquid crystal flow occurring at the time of application/removal of voltages to the liquid crystal) or a hydrodynamically unstable phenomenon induced by an electric field applied to the liquid crystal. In other words, it is assumed necessary to cause some flow of liquid crystal in order to cause the unidirectional movement of minute solid particles dispersed therein. The above-mentioned threshold is assumed to be present for this reason.

As a possible mechanism of the unidirectional movement of minute solid particles in a +x-axis or a −x-axis direction, I also have the following assumption.

More specifically, in the case of anti-parallel rubbing, i.e., one electrode side is rubbed in one direction and the other electrode is rubbed in the opposite direction, I assume that a liquid crystal flow in the +x-axis direction is formed in the vicinity of one electrode and a reverse liquid flow in the −x-axis direction is formed in the vicinity of the other electrode. The direction of the liquid crystal flow in the vicinity of an electrode is not changed even when the polarity of an applied pulse voltage is reversed. For this reason, when a voltage of one polarity is applied, minute solid particles are attracted to one electrode side and if the liquid crystal flow in the vicinity of the electrode is in the +x-axis direction, then minute solid particles are moved in the +x-axis direction. Then, if the voltage polarity is reversed, the minute solid particles are attracted to the other electrode, and the minute solid particles are moved in the −x-axis direction. It has been experimentally confirmed that under application of voltages of different polarities, minute solid particles are attracted to different electrodes.

However, it is also possible to assume that the unidirectional movement of minute solid particles is caused according to a mechanism or kinetics other than the liquid crystal flow described above. For example, it is possible to assume that the minute solid particles are pushed by a periodical orientation change of liquid crystal molecules. Accordingly, the moving mechanism of the minute solid particles used in the present invention is not restricted to the one according to liquid crystal flow.

As described above, in the system of the present invention, it is possible to reverse the moving direction of minute solid particles by reversing the polarity of applied voltage (rectangular wave voltage in this embodiment) applied between the opposing electrodes sandwiching the mixture in the case where the opposing electrode sides have been rubbed in mutually opposite directions (anti-parallel directions). On the other hand, in the case where the opposing electrode sides are rubbed in identical directions, the movement direction of minute solid particles is not reversed even if the polarity of applied voltage is reversed. A possible reason for this phenomenon is assumed to be because the liquid crystal flows in proximity to the opposing electrodes are identical in directions so that the moving direction of solid particles is not reversed even if the polarity of the applied voltage is reversed.

Accordingly, in case where a reversible change in moving direction of solid particles is desired, it is preferred to rub the opposing electrode sides in anti-parallel directions.

However, as far as the unidirectional movement of minute solid particles is required in the present invention, it is possible to rub only one electrode side or rub the opposing electrode sides in mutually crossing directions.

The rubbing may preferably be applied onto alignment films coating the opposing electrodes but can also be applied directly to the opposing electrodes.

Similarly as in a second embodiment described hereinafter, it is also possible to effect a color display in this embodiment, e.g., by coloring the minute solid particles (into, e.g., R, G, B, etc.), coloring the electrodes and/or substrates in different colors, and controlling the distribution state of the minute solid particles.

The rectangular pulse voltage preferably used in the present invention for causing the unidirectional movement of minute solid particles may preferably have a frequency in a range of 90 Hz–10 kHz and an amplitude sufficient to form an electric field intensity of at least 1 volt/$\mu$m between the opposing electrodes. Even if such an electric field intensity is provided, if the frequency of rectangular wave voltage is low, e.g., 1–80 Hz, the minute solid particles are liable to cause random movement without directionality. Such random movement of the minute solid particles is sometimes preferred for providing an opaque state of the mixture.

The above-mentioned preferred ranges of frequency and electric field intensity can vary depending on the property of liquid crystal, the material, size and specific gravity of the minute solid particles, and the rubbing intensity. Accordingly, it is preferred to select appropriate frequency and electric field intensity so as to selectively cause the unidirectional or random movement of the minute solid particles in the present invention.

In the above embodiment, polymer beads or silica beads are used as the minute solid particles. In case where minute solid particles of other materials are used, it is possible that minute solid particles cause a unidirection movement in an opposite direction under identical voltage application conditions compared to the above-described embodiment. More specifically, such minute solid particles 15 can unidirectionally move in an opposite −x-axis direction when single-polarity (positive) rectangular voltages (cycle=t1, amplitude=V1) as shown in FIG. 2 are applied to the electrode 12 of the electrodes 11 and 12 from the voltage application means 16, and in a +x-axis direction when single-polarity (negative) rectangular voltages as shown in FIG. 3 are applied to the electrode 12 of the electrodes 11 and 12. In this way, the direction of unidirectional movement is not determined by the voltage application conditions alone but depends also on the material of the minute solid particles.

Next, an embodiment of operation of a display device according to the present invention will be described with reference to FIGS. 5A–5E.

Referring to these figures, the display device includes a pair of transparent opposing electrodes 51 and 52 supported on transparent substrates 53 and 54, respectively, and a mixture disposed between the opposing electrodes 51 and 52 including a liquid crystal (not shown) and minute solid particles 55. A spacer for determining the gap between the transparent substrates 53 and 54 is omitted from showing. The electrode 51 has been rubbed in a +x-axis direction, and the electrode 52 has been rubbed in a −x-axis direction.

Figure 5A:
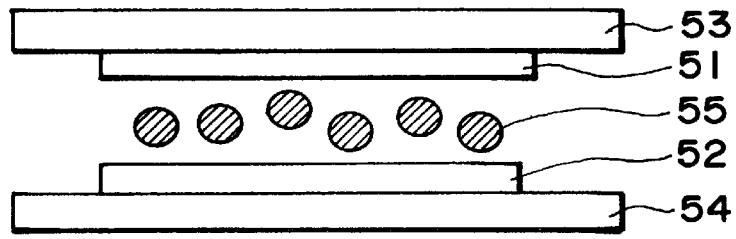
FIGS. 5A–5G illustrate steps for movement of minute solid particles used for display in an embodiment of the display device according to the invention.
Figure 5B:
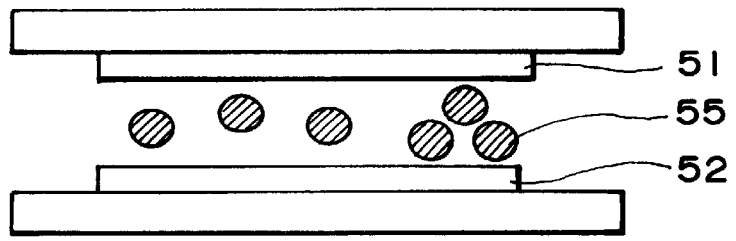

In the display device, the minute solid particles are assumed to be first uniformly disposed between the opposing electrodes 51 and 52 as shown in FIG. 5A. When the device (cell) in this state is observed in a y-axis direction, the cell looks entirely in an opaque or white turbid state. The device in this state retains the state under no voltage application, thus showing a memory characteristic.

Figure 5C:
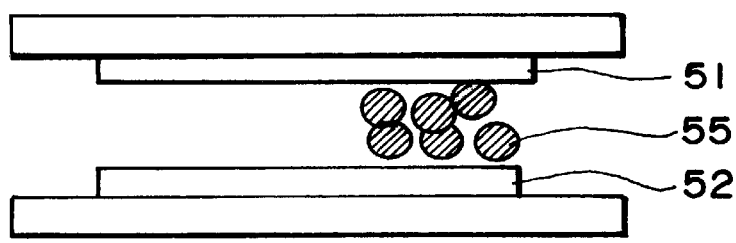

The device in this state shown in FIG. 5A is then supplied with periodical rectangular single polarity pulse voltages as shown in FIG. 2 (referred to hereinafter as a first input signal) for unidirectionally moving the minute solid particles 55 in a +x-axis direction. As a result, the minute solid particles 55 are moved in the +x-axis direction. In this instance, the solid particles having reached the proximity of an edge of the electrodes remain thereat. On further application of the first input signal, the solid particles are localized at (the proximity of) the edge as shown in FIG. 5C. The device (cell) in this state (FIG. 5C), when observed in the y-axis direction, looks clearer than in the state of FIG. 5A. When the application of the first input signal to the device in the state of FIG. 5C is terminated, the solid particles 55 are not moved from the position, thus retaining the clear (transparent) state of the device. Thus, a memory characteristic is exhibited.

Figure 5D:
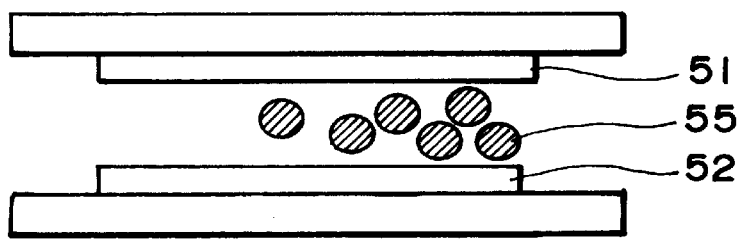

The device in this state shown in FIG. 5C is then supplied with periodical rectangular single-polarity pulse voltages as shown in FIG. 3 (referred to hereinafter as a second input signal) of a polarity opposite to that of the first input signal for unidirectionally moving the minute solid particles 55 in a −x-axis direction. As a result, the localized state of the minute-solid particles at the electrode edge is collapsed as shown in FIG. 5D.

Figure 5E:
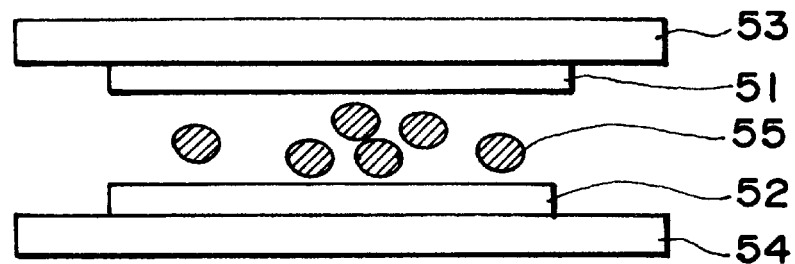

On further application of the second input signal, the minute solid particles are brought to a state of dispersion between the opposing electrodes 51 and 52 as shown in FIG. 5E. This dispersion state of the minute solid particles is however less uniform than the dispersion state shown in FIG. 5A. The device in this state (FIG. 5E), when observed in the y-axis direction, looks more turbid or opaque than in the state shown in FIG. 5D. The minute solid particles in the dispersed state (FIG. 5E) do not move even when the application of the second input signal is terminated but retain the opaque state.

Figure 5F:
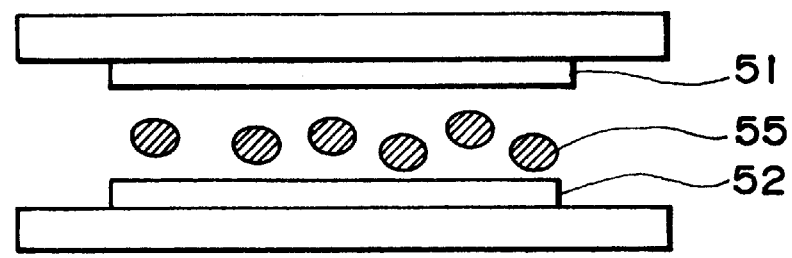

Further, if the device in the dispersed state shown in FIG. 5E is supplied with the above-mentioned voltage having a relatively low frequency (of e.g., 1–80 Hz) and an amplitude providing an electric field (of, e.g., at least 1 volt/μm) suitable for causing random movement of the minute solid particles, the dispersion state of the minute solid particles is brought to a more uniform dispersion state as shown in FIG. 5F. It is preferred that the periodical voltage for causing random movement of the minute solid particles has a polarity identical to that of the second input signal used for causing the state of FIG. 5E while an opposite polarity voltage can also be used.

It is also possible to convert the state of FIG. 5C into the state of FIG. 5F by applying such a voltage for causing random movement of the minute solid particles to the device in the state of FIG. 5C. In this case, the applied voltage may preferably have a polarity opposite to that of the first input signal used for causing the state of FIG. 5C.

Figure 5G:
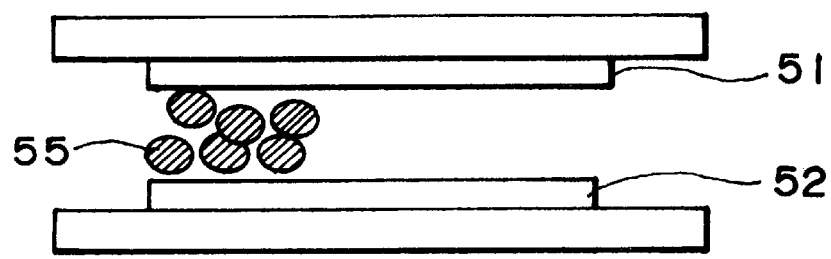

On further application of the second input signal to the device in the state of FIG. 5E, the minute solid particles 55 are again localized at an edge (opposite to the localized edge in the state of FIG. 5C) of the opposing electrodes 51 and 52 as shown in FIG. 5G. Accordingly, in the case of converting a transparent state to an opaque state by application of periodical voltage for causing unidirectional movement of the minute solid particles, it is necessary to terminate the voltage or convert the voltage into the voltage for causing random movement of the minute solid particles after the state of FIG. 6E is formed.

As described above, the display device according to this embodiment of the present invention is characterized in affecting a display by changing the dispersion state of minute solid particles sandwiched between the opposing electrodes over an extension of the electrodes between a state of localization at an edge of the electrodes and a state of dispersion between the electrodes by applying a periodical voltage between the opposing electrodes.

According to a preferred embodiment of the present invention, the minute solid particles used in the present invention comprise a crystalline form of organic molecules, which may more preferably have at least one inter-molecular interaction site. A preferred type of inter-molecular interaction may be a non-covalent bond, such as a hydrogen bond. Accordingly, the above-mentioned inter-molecular interaction site may be any site or group capable of forming a non-covalent bond, such as a hydrogen bond between molecules. Such an inter-molecular interaction site may for example include an amide group.

The minute solid particles used for constituting a mixture with a liquid crystal to fill a hollow cell in the display device of the present invention may preferably comprise a crystal of organic molecules, which retain a mesomorphic or liquid crystalline residue group, so as to exhibit a better memory characteristic under no voltage application. Examples of the mesomorphic residue group may include a nematic mesomorphic residue group. An example of such a crystalline organic molecule may include one represented by the following formula (1):

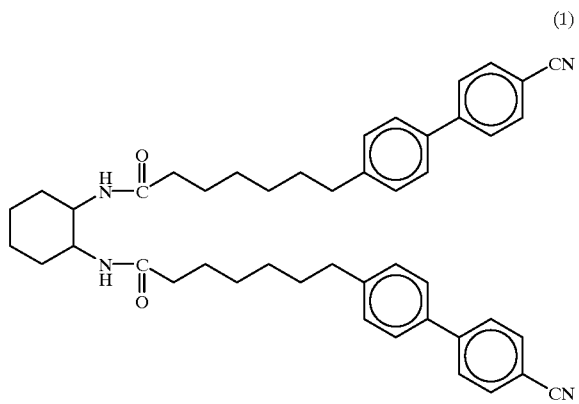

(1)

In the case of using such an organic molecular crystal as a material constituting the minute solid particles, it is preferred to use the organic molecular crystal after recrystallization. The recrystallization may be performed according to any known manner, but examples thereof may include the following four methods.

(Method 1)

A mixture of a powdery organic molecule and a liquid crystal is heated until the powder is melted, and then cooled to precipitate crystals of the organic molecule in the liquid crystal.

(Method 2)

A mixture of a powdery organic crystal and a liquid crystal is dissolved in a volatile solvent commonly functioning as good solvent for the organic crystal and the liquid crystal (e.g., chloroform), and the solvent is vaporized from the resultant solution to leave a mixture wherein crystals of the organic molecule are precipitated.

(Method 3)

Powder of an organic molecule is melted under heating and then cooled to precipitate crystals of the organic molecule.

(Method 4)

Powder of an organic molecule is dissolved in a volatile good solvent for the organic molecule (e.g., chloroform), and then the solvent is vaporized to precipitate crystals of the organic molecule.

Further, as the minute solid particles as a material for constituting the display device of the present invention, it is also possible to use minute particles onto the surface of which an organic molecule is bonded or attached. Such a surface-bonded organic molecule is not particularly limited but may preferably comprise an organic molecule having a mesomorphic residue group. The substrate minute particles surface-bonded or surface-coated with such an organic molecule may comprise any materials and may for example comprise polymer beads or metal oxide particles. Further, the minute particles may have any shapes inclusive of spherical, acicular and flat. It is however preferred that the minute particles have a uniform shape and a uniform size in a cell for constituting the device. The opposing electrode may be bonded to the minute particles according to any mode inclusive of covalent bonds, such as an amide bond, and non-contact bonds, such as electrostatic attraction.

The liquid crystal used for constituting the mixture with the minute solid particles to be disposed in the display device of the present invention is not particularly restricted, but it is preferred that the liquid crystal exhibits a nematic phase at least within an expected operation temperature range of the display device. It is possible to use a mixture of two or more species of liquid crystal for this purpose.

(2) Second Embodiment

In this embodiment, it is possible to use minute solid particles, low-molecular weight liquid crystal, alignment film and rubbing treatment similar to those described with reference to the First embodiment.

This embodiment is described with reference to FIGS. 13 to 18.

First, the structure of a display device according to this embodiment will be described with reference to FIGS. 13 to 16.

Figure 14:
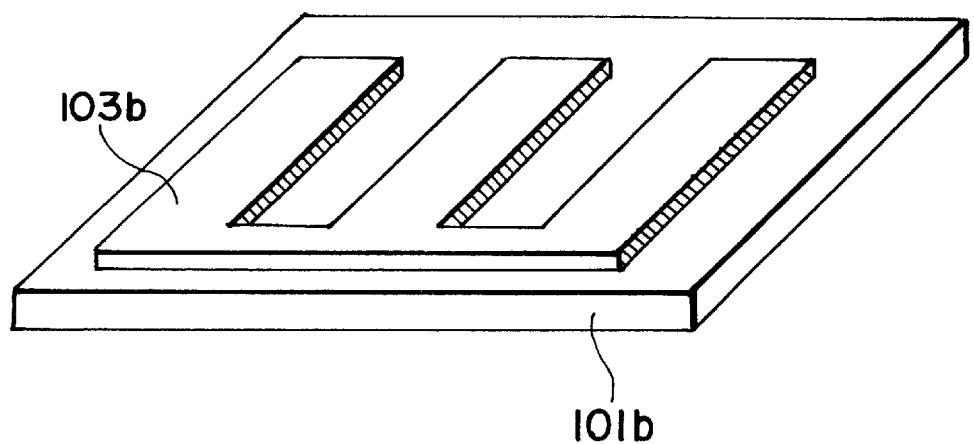
FIG. 14 is a perspective view showing a comb-shaped electrode formed on a substrate.
Figure 15:
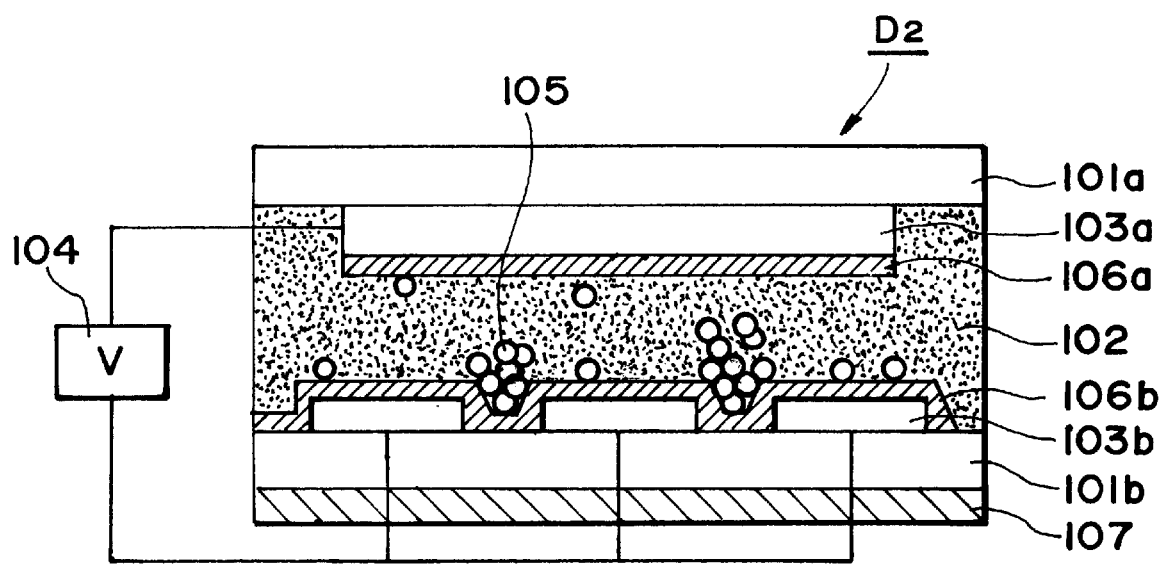
FIG. 15 is a sectional view showing a structure of another example display device.

With reference to FIGS. 13A and 13B, a display device D1 according to this embodiment includes a pair of substrates 101a and 101b disposed with a prescribed gap therebetween, a low-molecular weight liquid crystal 2 disposed between the substrates 101a and 101b, a pair of opposing electrodes 103a and 103b disposed on the substrates 101a and 101b, respectively, so as to sandwich the liquid crystal 102, and a voltage application means 104 for applying an alternating voltage between the opposing electrodes 103a and 103b. The liquid crystal 102 retains a particles of minute polarity 105 dispersibly therein. At least one of the opposing electrodes 103a and 103b (103b in FIGS. 13A and 13B) is divided or branched into parallel stripes (as shown in FIG. 14). Further, at least one of the electrodes 103a and 103b may be coated with films 106a and/or 106b. In this embodiment, both electrodes 103a and 103b are surface-coated with films 106a and 106b, so that the film 106b retains concavities or grooves A at parts of spacings between the stripe electrodes 103b.

Not only one but both of the opposing electrodes 103a and 103b can be formed in stripes. The stripe electrodes 103b in FIG. 14 are connected along one side but can also be connected along two opposite sides or in discrete stripes capable of applying a constant voltage to plural stripe electrodes constituting a pixel. In case where the opposing electrodes on both substrates are divided into stripes, the stripe electrodes on two substrates may preferably be disposed so as to intersect each other at right angles. In this case, it is also preferred that the electrodes 103a on one substrate are arranged at a pitch different from a pitch for the electrodes 103b on the other substrate. This is because in case where the electrodes 103a and the electrodes 103b on the opposing substrates are arranged at equal pitches, the forces acting on the minute particles 105 (i.e., a force caused by liquid crystal flow and electrophoretic force described hereinafter) lack anisotropy, so that it becomes difficult to move the minute particles to the concavities A and provide a bright display state. In FIGS. 13A and 14, the electrodes 103b are formed as three stripes but can also be two or four or more stripes for constituting one pixel.

The species and structure of the liquid crystal 102 are not particularly restricted, but it is preferred that the liquid crystal exhibits a nematic or cholesteric phase at least within an operation temperature range of the display device. It is possible to use a mixture of two or more species of liquid crystal for this purpose.

The minute particles 105 may comprise any of an organic material, an inorganic material and a composite of inorganic and organic materials. Specific examples thereof may include: polymer beads, metal oxide particles and aggregates of organic molecules. The individual minute particles 105 may preferably have a uniform size which is smaller than the thickness of the liquid crystal layer 102 (even if they absorb liquid crystal or cause chemical change) in their state dispersed in the liquid crystal 102 so as to be movable in the liquid crystal layer 102. Further, the minute particles may have any shapes, such as spherical, flat or acicular, while the shape should be uniform.

The minute particles 105 and the low-molecular weight liquid crystal 102 may be blended in an appropriate ratio allowing the movement of the minute particles 105 under voltage application, e.g., 1–90 wt. parts, preferably 2–80 wt. parts, of minute particles per 100 wt. parts of the liquid crystal.

The coating films 106a and 106b may be disposed to exhibit an insulating function, a function of aligning the liquid crystal 102 or both of these functions. The coating films 106a and 106b may comprise an appropriate material selected in view of the expected function, and a preferred example thereof may be a polyimide film. In order to impart to the films 106a and 106b a function of aligning the liquid crystal 102, it is appropriate to apply a homogeneous or horizontal aligning treatment, such as rubbing. The rubbing may be applied to both films 106a and 106b coating the opposing electrodes 103a and 103b, and in this case, it is preferred that the films 106a and 106b are rubbed in mutually parallel and reverse directions (anti-parallel directions). This is effective for accelerating the movement of the minute particles 105 by causing the liquid crystal flow induced by an electric field between the opposing electrodes to effectively act on the minute particles 105 without causing irregular liquid crystal flow. The films 106a and 106b may be provided with both functions of liquid crystal alignment and insulation by forming the films of an insulating material and applying to the film surfaces a homogeneous aligning treatment, such as rubbing.

The above-mentioned display device may be constituted as either a transmission-type display device using transmitted light for data display or a reflection-type display device using reflected light for data display. In the case of constituting such a transmission-type display device, it is necessary to form both substrates 101a and 101b and both opposing electrodes 103a and 103b of transparent materials and preferred to form the minute particles of an opaque material (e.g., in a dark color, such as black).

On the other hand, in the case of providing a reflection-type display device, at least the substrate 101a and the electrode(s) 103a on the viewer's side are made transparent, and a reflection layer (e.g., one denoted by numeral 107 in FIGS. 15 and 16) is disposed on the rear side of the liquid crystal layer 102. In this case, it is possible to form the reflection layer 107 in a bright color (e.g., white) and form the minute particles 105 in a dark color (e.g., black) to provide a system wherein a dark display state is formed by dispersion of the minute particles 105 between the opposing electrodes 103a and 103b and a bright display state is formed by substantially excluding the minute particles 105 from a region between the opposing electrodes 103a and 103b; or to form the reflection layer 107 in a dark color (e.g., black) and form the minute particles 105 in a bright color (e.g., white) to provide a system wherein a bright state is formed by dispersion of the minute particles 105 between the opposing electrodes 103a and 103b and a dark display state is formed by excluding the minute particles from a region between the opposing electrodes 103a and 103b. In the case of forming a reflection-type display device, it is possible to color the substrate 101b and the electrode(s) 103b on the side more remote from the viewer (in the lower side or the side provided with the reflection layer 107 in the embodiment of FIGS. 16A and 16B).

The gap between the substrates 101a and 101b may be regulated by disposing a spacer (not shown) between the substrate 101a and 101b.

A driving method for the above-described display device will be described below.

Figure 17A:
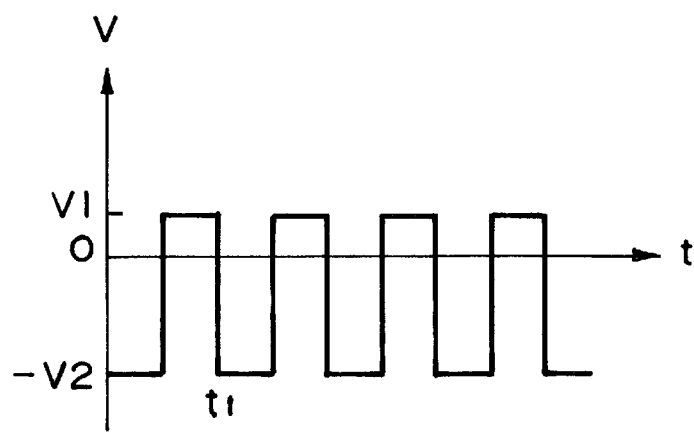
FIGS. 17A–17C are waveform diagrams showing various unbalanced alternating voltages used for driving an example display device.
Figure 17B:
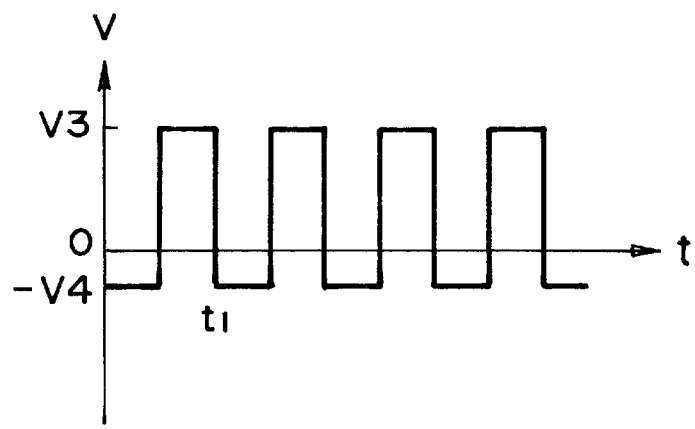
Figure 17C:
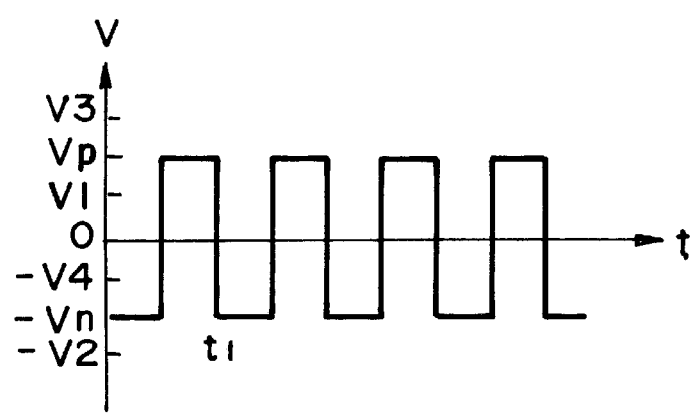

A region between the opposing electrodes 103a and 103b is supplied with a selected one of plural types of alternating voltages as shown in FIGS. 17A to 17C wherein only 3 types are shown for example. As a result, the number of minute particles 105 disposed at the region between the opposing electrodes 103a and 103b is changed to provide a bright or a dark display state. Further, when the application of an alternating voltage is interrupted, the minute particles 15 are retained at the position, thereby exhibiting a memory display characteristic. Further by changing the amplitudes of the alternating voltages, it is possible to effect a gradational display.

Examples of such alternating voltages are shown in FIGS. 17A–17C, among which an unbalanced alternating voltage (retaining a negative DC component) shown in FIG. 17A is adapted for moving the minute particles in one direction, another unbalanced alternating voltage (retaining a positive DC component) shown in FIG. 17B is adapted for moving in the reverse direction, and a balanced alternating voltage similar to the one shown in FIG. 17C does not function to substantially move the minute particles.

It is also possible to use single-polarity pulse voltages as shown in FIGS. 2 and 3 used in the previous embodiment.

The unbalanced alternating voltage shown in FIG. 17A can be prepared by superposing a balanced alternating voltage (amplitude±(V1+V2)/2) as shown in FIG. 18 with an appropriate level of offset voltage (=(V1−V2)/2). However, if voltages V3 an V4 shown in FIG. 17B voltages Vp and Vn shown in FIG. 17C are set to satisfy V1+V2=V3+V4=Vp+Vn, the alternating voltages shown in FIGS. 17B and 17C can also be prepared by superposing the balanced alternating voltage shown in FIG. 18 with different levels of offset voltages. The absolute value of such offset voltage can be set at arbitrary levels within an extent of not obstructing the display function of the display device but is preferably smaller than (V1+V2)/2.

In the case of applying (rectangular) alternating voltages as shown in FIGS. 17A–17C, if the amplitude (or peak height) or frequency is too low, the above-mentioned force of liquid crystal flow and electrophoretic force are too small to move the minute particles 105, so that a sufficiently large amplitude and frequency are required. The required levels of amplitude and frequency can depend on the species of liquid crystal, the material and rubbing intensity of the films 106a and 106b and may appropriately be selected so as to provide a bright and a dark state of the display device. More specifically, the alternating voltage may preferably have a frequency of 50 Hz to 10 kHz, particularly 90 Hz to 10 kHz, and an amplitude ((V1+V2)/2) for providing an electric field intensity of at least 1 volt/$\mu$m in terms of an absolute value.

The phenomenon of movement of minute particles 105 under application of alternating voltages has not been fully clarified but may be attributable to a force of liquid crystal flow induced by an electric field between the opposing electrodes, and an electrophoretic force caused by the electric field between the opposing electrodes, respectively acting on the minute particles.

Figure 16A:
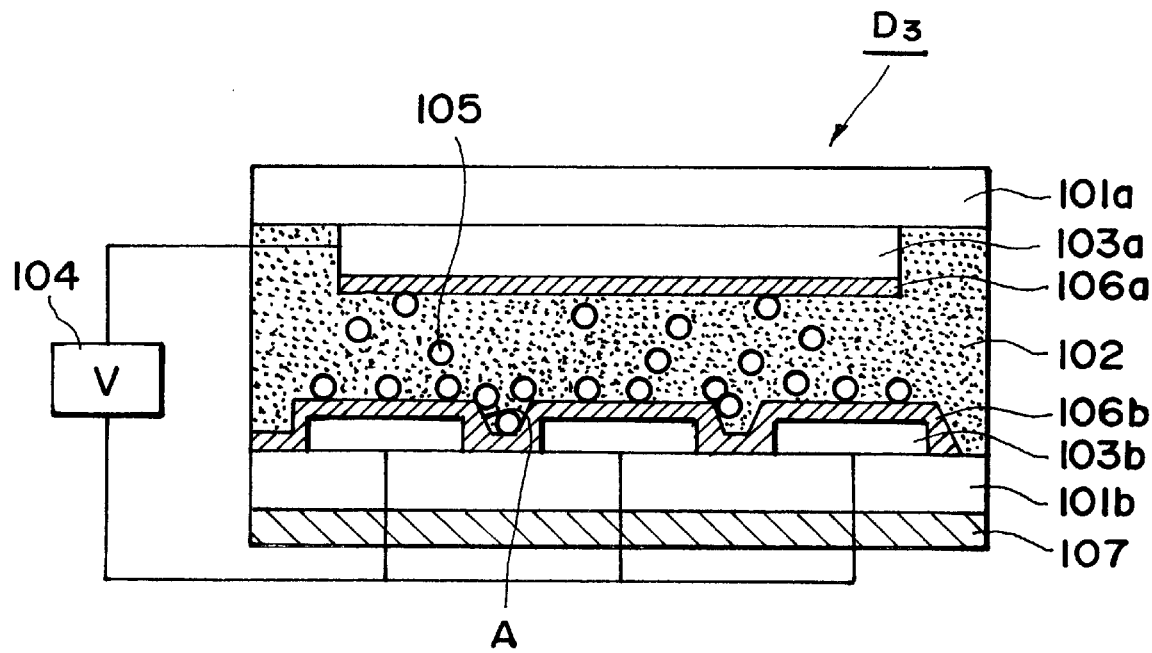
FIGS. 16A and 16B are sections views showing a structure and two states in another example display device.
Figure 16B:
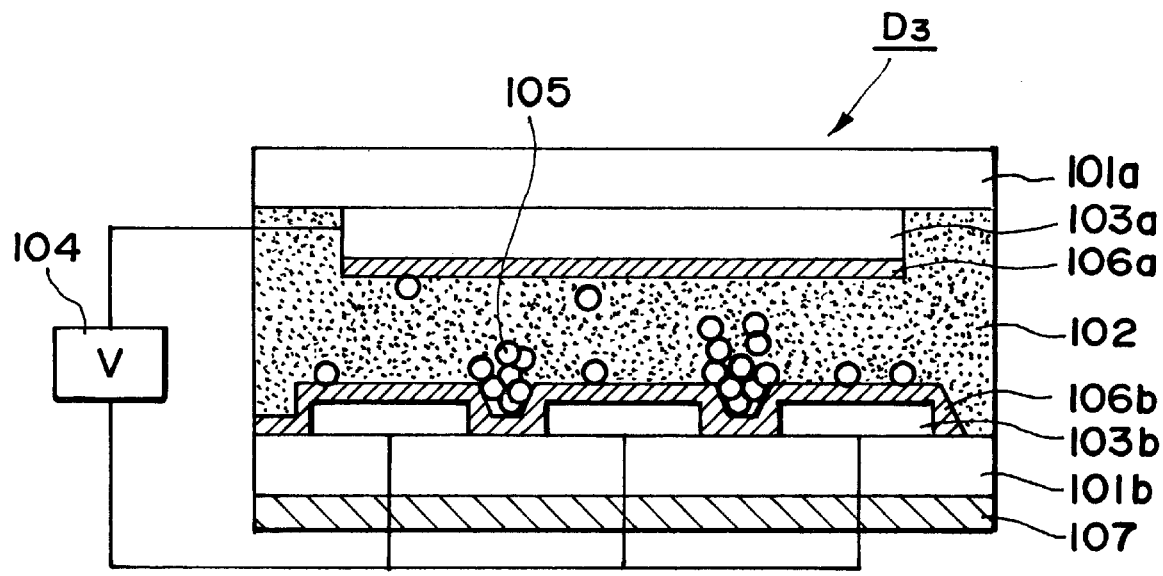

The phenomenon of holding of the minute particles after interruption of voltage application has not been fully clarified either but it is assumed that the dispersion state and the localized state of the minute particles can be retained due to factors, such as the viscosity of the liquid crystal, the force of agglomeration of minute particles, and mutual interaction between the minute particles and the substrates inclusive of the electrodes thereon. Particularly, the memory of a bright or transparent state is assumed to be realized by the localization of minute particles at cavities A formed on the film 106b as shown in FIG. 16B. The memory state is realized regardless of whether the display device is retained horizontally or vertically.

According to this embodiment, a memory display is realized even under no voltage application, thus contributing to economization of power consumption, and a gradational display can be effected.

Hereinbelow, some specific examples are described.

EXAMPLE 1

Figure 6:
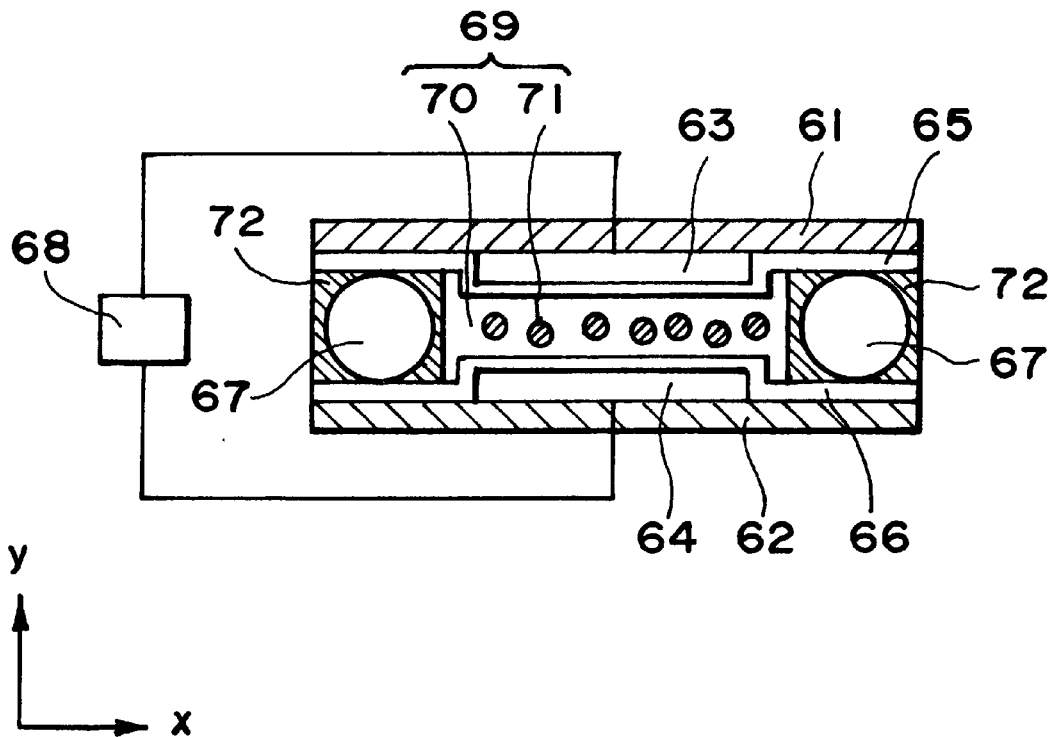
FIG. 6 illustrate a basic organization of display devices used n Examples 1 and 2.

A display device as shown in FIG. 6 was prepared in the following manner.

Polymer beads of 5 $\mu$m in diameter principally comprising polymerized divinylbenze ("MICROPEARL", mfd. by Sekisui Fine Chemical K.K.) were used as minute solid particles 71. Thus, 50 mg of the polymer beads were mixed with 50 mg of nematic liquid crystal 70 having a positive dielectric anisotropy ("BL6", mfd. by Merck & Co., Inc.), and the mixture was subjected to an ultrasonic treatment to uniformly disperse the polymer beads within the liquid crystal. The nematic liquid crystal exhibited properties including a nematic-isotropic (N-I) transition temperature of 113° C., a dielectric anisotropy at 1 kHz and 20° C. of +17.3 and a viscosity at 20° C. of 71 cSt. The resultant mixture 69 including the liquid crystal 70 and the minute solid particles 71 was incorporated in a single-pixel cell formed by a pair of transparent glass substrates 61 and 62 each measuring 1 cm×1 cm and having thereon 300 Å-thick and 500 $\mu$m-wide transparent electrodes 63 and 64, respectively, of ITO (indium tin oxide) and coated with liquid crystal alignment films 65 and 66 of 200 Å-thick rubbed polyimide film.

The polyimide alignment films 65 and 66 were each formed by applying a solution of polyimide precursor ("LX-1400", mfd. by Hitachi Kasei Kogyo K.K.) over the electrode by spin coating followed by baking at 150° C. Each polyimide film was subjected to 7 reciprocations of rubbing with a rubbing roller comprising polyester fiber yarn and an outer diameter of 58 mm, rotated at a speed of 600 rpm and moved at a speed of 2 m/min.

The cell structure was retained by a sealant 72 containing therein silica spacer beads 67 of 12.5 $\mu$m in diameter.

The above display device (cell) was prepared in the following manner.

First, a pair of the substrates 61 and 62 having thereon transparent electrodes 63 and 64 and rubbed alignment films 65 and 66 were provided. On the rubbed alignment film 66 over the electrode 64 on one substrate 62, the above-prepared mixture 69 of the liquid crystal and the minute solid particles was dropped. Then, a mixture of spacer beads 71 and a two-liquid room temperature curing type silicone sealant 72 was applied by a plastic spatula on opposite sides outside the electrode 64, and then the other substrate 61 having the electrode 63 was superposed thereon so as to form a pixel of 500 $\mu$m×500 $\mu$m at a region of the opposing electrodes 63 and 64, followed by placing thereon a flat plate of 50 g for applying a pressure and curing of the sealant to form a stacked structure. Then, a portion of the mixture 69 exuded through the cured sealant-free sides of the stacked structure was wiped out, and the sealant-free sides were sealed further with a sealant 72 to complete a cell structure.

Figure 7:
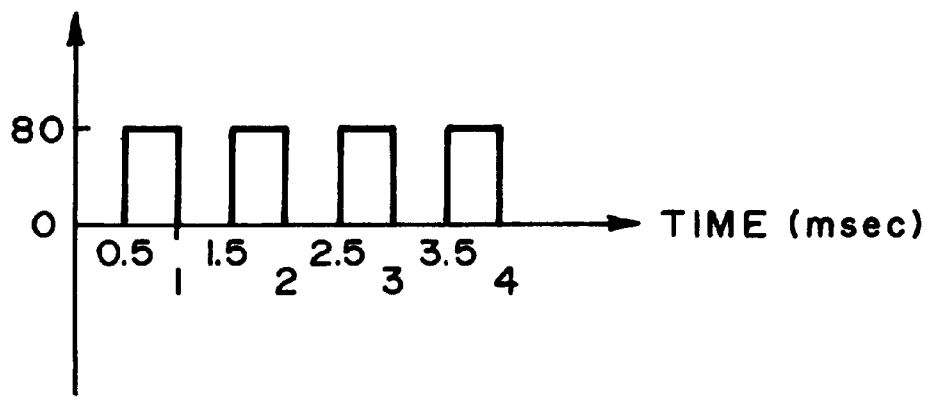

The thus-prepared display device was supplied with rectangular pulse voltages shown in FIG. 7 applied between the opposing electrodes 63 and 64 for 4 sec, so as to apply 80 volts to the electrode 64, whereby the display device originally in a white turbid state was turned into a clear state. According to a microscopic observation, the polymer beads curved a unidirectional movement in the x-axis direction during the voltage application. After termination of the voltage application, the polymer beads were observed to be localized at proximity to one side of electrode edges. The resultant clear state with the localized polymer beads was retained in memory even after the termination of the voltage application.

Then, the display device in the clear state was supplied with rectangular pulse voltages shown in FIG. 8 for 4 sec. so as to apply −80 volts to the electrode 64. Then, the display device was changed into a white turbid state which however was less uniform than the original white turbid state. During the voltage application, the polymer beads caused a unidirectional movement in the −x-axis direction. After the termination of the voltage application, the polymer beads were observed to be dispersed between the opposing electrodes, and the resultant white turbid state was retained in memory after the termination of the voltage application. Thus, the display device caused a reversal display state change between a transparent state and a white turbid state by application of pulse voltages as shown in FIGS. 7 and 8.

The display device in the white turbid state was then supplied with rectangular pulse voltages having a lower frequency of 20 Hz shown in FIG. 9 for 1 sec. so as to apply −80 volts to the electrode 64, whereby the device was brought to a white turbid state which was as uniform as the original white turbid state. During the application of the voltages shown in FIG. 9, the polymer beads caused a random movement with no directionality. The resultant uniform dispersion state was retained after the termination of voltage application according to microscopic observation.

Figure 10:
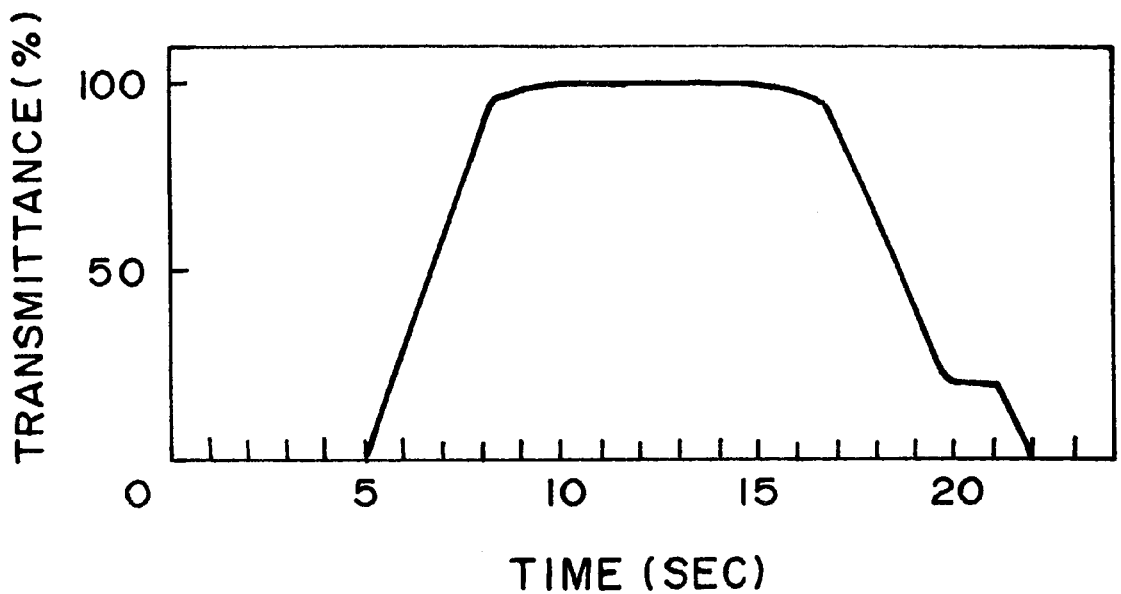
FIGS. 10 and 11 respectively show an example of transmittance change obtained by the display device of Example 1.

The above-mentioned transition from a white turbid state via a transparent state to a white turbid state was confirmed by a change in light transmittance as shown in FIG. 10 wherein a transmittance obtained in the state of uniform distribution is represented by 0%, and the transmittance in the clear state resultant after application of the voltages in FIG. 7 for 5 sec. is represented by 100%.

As shown in FIG. 10, the voltages shown in FIG. 7 were started to be applied at a time of 5 sec. and terminated at a time of 9 sec. Then, the voltages shown in FIG. 8 were started to be applied at a time of 16 sec. and terminated at a time of 20 sec. Further, the voltages shown in FIG. 9 were started to be applied at a time of 21 sec. and terminated at a time of 22 sec.

Figure 11:
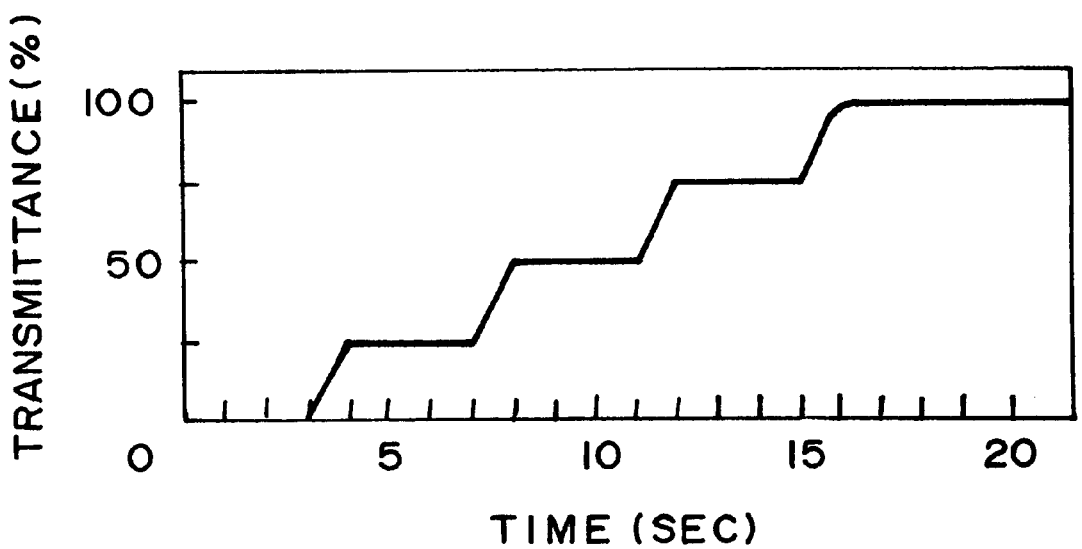

Then, the display device with the polymer beads in the uniform dispersion state was subjected to 4 operation cycles each including application of the voltage shown in FIG. 7 for 1 sec. and interruption of the voltages for 3 sec. During the operation cycles, the display device exhibited a stepwise transmittance change shown in FIG. 11, whereby the possibility of a gradational display wax confirmed.

EXAMPLE 2

A display device was prepared and evaluated in the same manner as in Example 1 except for using a different species of minute solid particles.

More specifically, a mixture display medium was prepared by blending 50 mg of 5 $\mu$m-dia. silica beads (mfd. by Nippon Denki Garasu K.K.) and /50 mg of the same nematic liquid crystal ("BL6", mfd. by Merck & Co., Ltd.), and subjecting the blend to an ultrasonic dispersion treatment.

As a result of application of rectangular pulse voltages in the same manner as in Example 1, the display device of this example caused a transition between states of different transmittances and a stepwise transmittance change similarly as in Example 1.

EXAMPLE 3

A display device having a structure as shown in FIG. 6 was prepared in the same manner as in Example 1 except for using 5 $\mu$m-dia. polydivinyl-benzene-based polymer beads ("MICROPEARL BB, mfd. by Sekisui Fine Chemical K.K.) instead of the polymer beads ("MICROPEARL", ditto.).

The display device was subjected to application of alternating voltages shown in FIGS. 12A and 12B.

More specifically, the display device containing the polymer beads in a uniformly dispersed state was supplied for 4 sec. with an alternating voltage shown in FIG. 12A applied to the electrode 64 relative to the grounded electrode 63. As a result, the display device originally in an opaque state was transformed into a transparent state. According to a microscopic observation, the polymer beads caused a unidirectional movement in the +x-axis direction during the voltage application. After termination of the voltage application, the polymer beads were observed to be localized at proximity to one side of electrode edges. The resultant clear state with the localized polymer beads was retained in memory even after the termination of the voltage application.

Then, the display device in the clear state was supplied with an alternating voltage shown in FIG. 12B for 4 sec. applied to the electrode 64. Then, the display device was changed into a white turbid state which however was less uniform than the original white turbid state. During the voltage application, the polymer beads caused a unidirectional movement in the −x-axis direction. After the termination of the voltage application, the polymer beads were observed to be dispersed between the opposing electrodes, and the resultant white turbid state was retained in memory after the termination of the voltage application.

Thus, similarly as in Example 1, by application of the voltages shown in FIGS. 12A and 12B, the display device of this example caused a transition between states of different transmittances and further a stepwise transmittance change similarly as in Example 1.

The application of unbalanced alternating voltages as shown in FIGS. 12A and 12B is believed to be more advantageous for causing a unidirectional movement of minute solid particles than single-polarity pulse voltages as shown in FIGS. 7 and 8. More specifically, in the case of application of single-polarity pulse voltages, the minute solid particles are continually attracted to one electrode side. In this instance, if a large attraction force acts between the electrode and the minute particles, the horizontal movement of the minute particles can be remarkably obstructed. Such a circumstance can be encountered at a high possibility in case where the minute particles have a large charge in the liquid crystal or an increased electric field intensity is applied between the opposing electrodes so as to accelerate the movement of the minute particles. On the contrary, under the application of unbalanced alternating voltages as in this example, the minute particles can be moved toward the opposite electrode side, thus obviating the sticking of minute particles onto one electrode side liable to retard the movement of the minute particles.

EXAMPLE 4

A display device was prepared in the same manner as in Example 1 except for replacing the mixture display medium with a mixture prepared in the following manner.

More specifically, micro-crystals of a compound of the following structural formula (1) were used as minute solid particles.

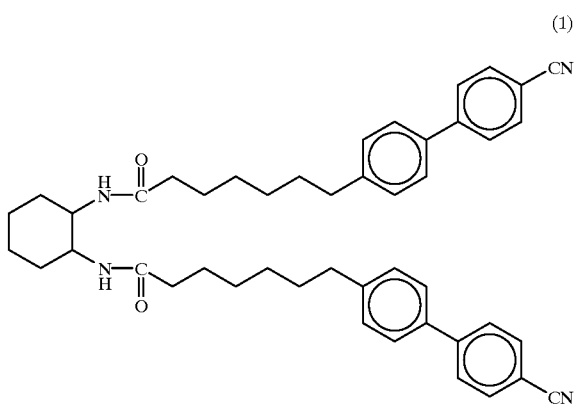

(1)

The compound of the above formula (1) was prepared in the following manner. First of all, 8.1 g (26.3 mmol) of a compound of formula (2) below, 1.5 g (13 mmol) of (1R, 2R)-(−)-diaminocyclohexane, 4.3 g (31.8 mol) of HOBt (1-hydroxybenzotriazole), and 6.5 g (31.5 mmol) of DCC (dicyclohexylcarbodiimide) were dissolved in 60 ml of DMF (dimethylformamide), and the solution was stirred overnight.

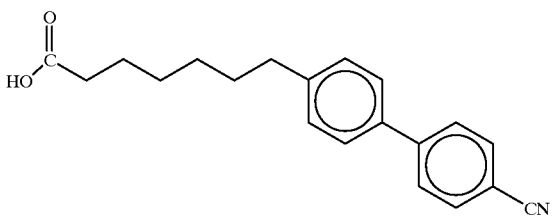

(2)

Then, crystals precipitated in the reaction liquid were recovered by filration and then dissolved in 500 ml of chloroform. The solution was then sequentially washed with 200 ml of 1M-HCl solution, 200 ml of saturated $NaHCO_3$ aqueous solution and 200 ml of saturated NaCl aqueous solution, followed by column purification and drying to recover 1.5 g of the compound of the above formula (1).

500 mg of the compound of the formula (1) thus prepared and 500 mg of nematic liquid crystal ("BL6", mfd. by Merck & Co., Inc.) were dissolved in chloroform, and then the chloroform was gradually evaporated. As a result, microcrystals of the compound of the formula (1) not soluble with the liquid crystal were precipitated within the liquid crystal to form a mixture, which was subjected to an ultrasonic treatment to uniformly disperse the microcrystals within the liquid crystal, thus providing a mixture display medium.

A display device was prepared by using the mixture display medium otherwise in the same manner as in Example 1.

As a result of application of rectangular pulse voltages in a similar manner as in Example 1, the display device thus prepared caused a transition between states of different transmittances and a stepwise transmittance change similarly as in Example 1.

EXAMPLE 5

A display device was prepared in the same manner as in Example 4 except for replacing the mixture display medium with a mixture prepared in the following manner.

Minute solid particles used in this example were prepared by bonding a liquid crystal residue group to the surface of 8 μm-dia. microbeads having surface amino (—$NH_2$) groups (mfd. by Wako Jun-yaku K.K.). More specifically, a reaction of the compound of the formula (2) (condensation reaction using DCC) was performed similarly as in Example 4 but in the presence of the micro-beads having surface amino groups to be bonded to the surface of the microbeads via an amide (—NHCO—) bond.

50 mg of the minute solid particles were blended with the same nematic liquid crystal ("BL6") used in Example 4, followed by a similar ultrasonic dispersion treatment to provide a mixture display medium.

A display device was prepared by using the mixture display medium otherwise in the same manner as in Example 4.

As a result of application of rectangular pulse voltages in a similar manner as in Example 4, the display device thus prepared caused a transition between states of different transmittances and a stepwise transmittance change similarly as in Example 4.

EXAMPLE 6

A transmission-type display device D4 having a structure as illustrated in FIG. 19 was prepared in the following manner.

Two glass substrates 101a and 101b were provided, and on one substrate 101a, a square ITO transparent electrode 103a of 1.5 cm×1.5 cm was provided. On the other substrate 101b, a comb-shaped ITO transparent electrode 13b including 6 stripe electrodes each having a width of 100 μm and a thickness of 1200 Å and arranged with a spacing of 5 μm. The electrodes 103a and 103b were respectively coated with a polyimide film, and only the polyimide film coating the square ITO electrodes 103a was rubbed in an X-axis direction shown in FIG. 19 under conditions identical to those adopted in Example 1.

Separately, a mixture display medium was prepared by blending 50 mg of 3 μm-dia. black colored polymer beads with 50 mg of a nematic liquid crystal ("BL9", mfd by Merck & Co., Inc.), followed by an ultrasonic dispersion treatment. The nematic liquid crystal exhibited an N-I transition temperature of 108° C., a dielectric anisotropy (at 1 kHz and 20° C. of +15.5, and a viscosity at 20° C. of 83 cSt.

Then, the mixture (not shown) was dropped onto the comb-shaped electrode 103b on the substrate 101b and the other substrate 103a was superposed thereon so that the rubbing direction (X-axis) on the polyimide film coating the electrode 103a was perpendicular to the extension direction of the stripe electrodes 103b, followed by sealing the periphery of the substrates with a silicone resin similarly as in Example 1 to form a single-pixel display device according to this example.

The display device D4 thus prepared. was driven in the following manner.

Figure 20A:
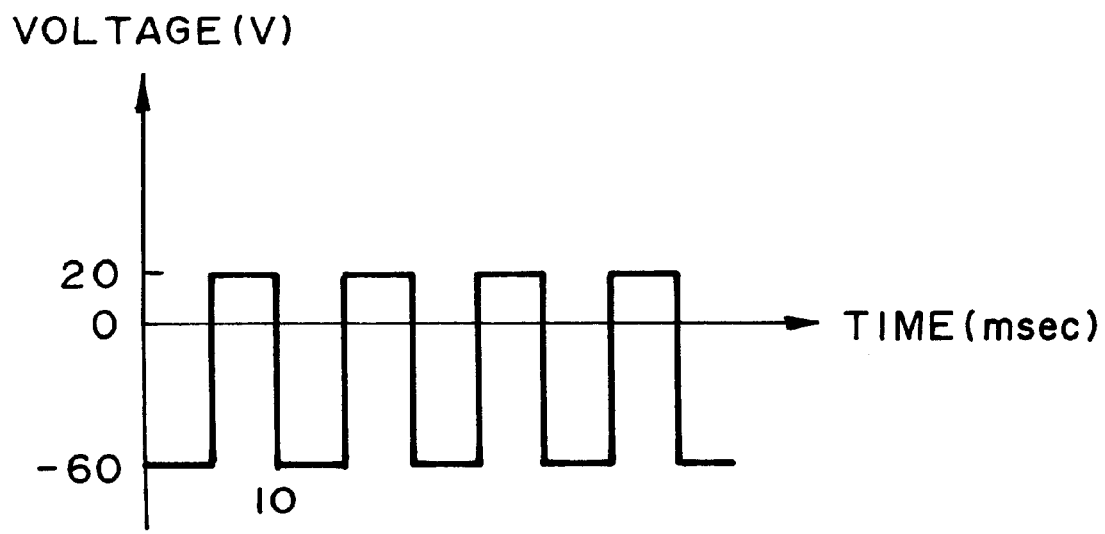
FIGS. 20A and 20B are waveform diagrams showing voltages signals for driving the device of FIG. 19.

An unbalanced rectangular alternating voltage shown in FIG. 20A including positive pulses having a peak height of 20 volts and negative pulses having a peak height of −60 volts was applied to the comb-shaped electrode 103b for 30 msec while grounding the counter electrode 103a, whereby the display device in the initially dark state was brought to a bright state, which was memorized even after the termination of the alternating voltage.

Figure 21A:
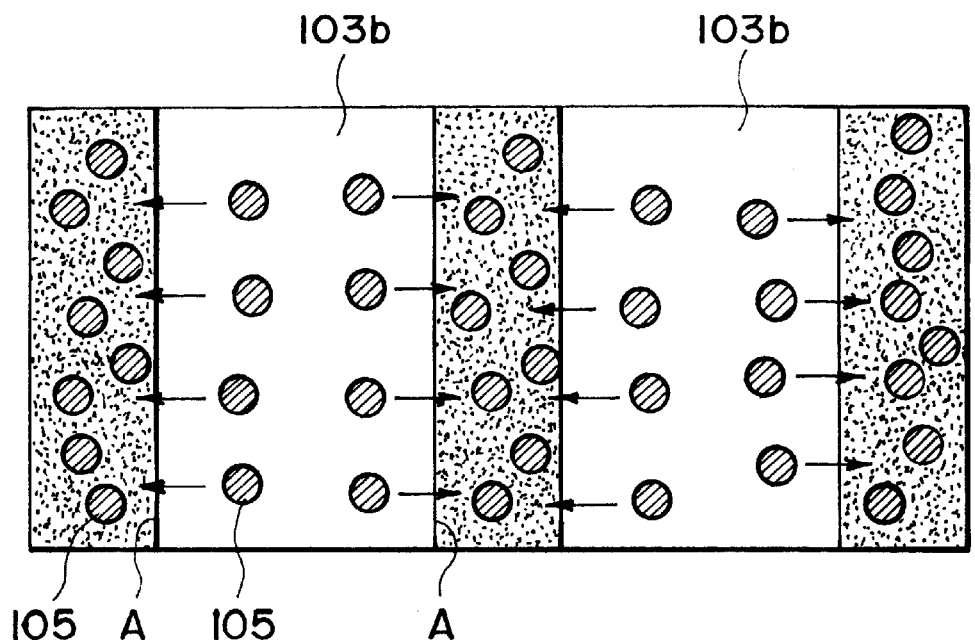
FIGS. 21A and 21B are schematic partial plan views for illustrating movement of minute particles in the device of FIG. 19.
Figure 21B:
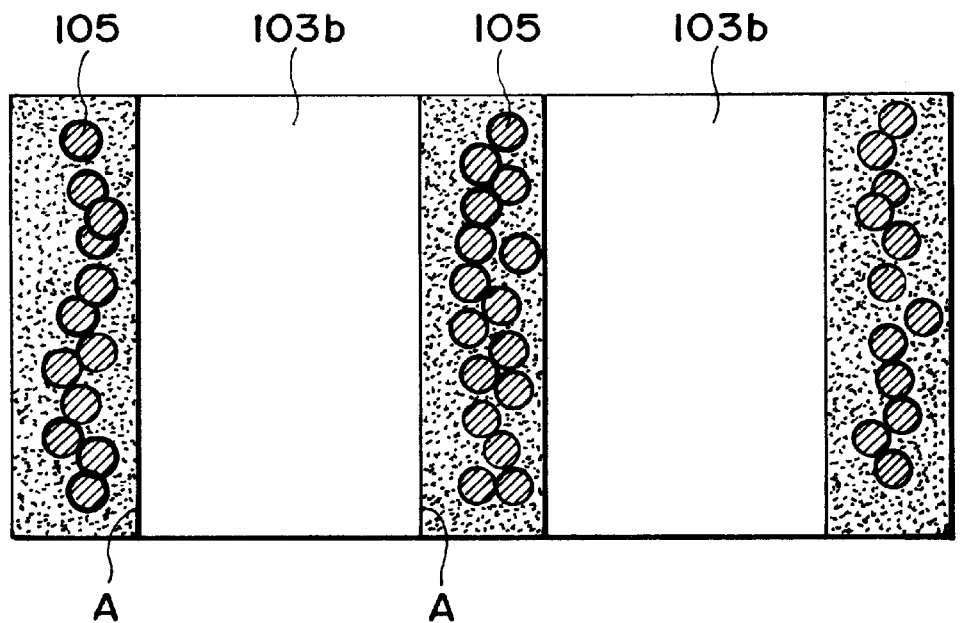

According to a microscopic observation as illustrated in FIGS. 21A and 21B, the polymer beads 105 were initially uniformly dispersed between the substrates before the voltage application and then moved toward the spacings (concavities or grooves) formed between the stripe electrodes 103b, i.e., in the direction of arrows in FIG. 21A, under application of the alternating voltage shown in FIG. 20A and collected at and in proximity to the spacings (as shown in FIG. 21B). As a result of the movement, almost no polymer beads 105 were left at the regions between the opposing electrodes 103a and 103b. Further, even after termination of the voltage application, the polymer beads 105 were not moved but retained at the position shown in FIG. 21B, thus showing a memory characteristic.

Figure 20B:
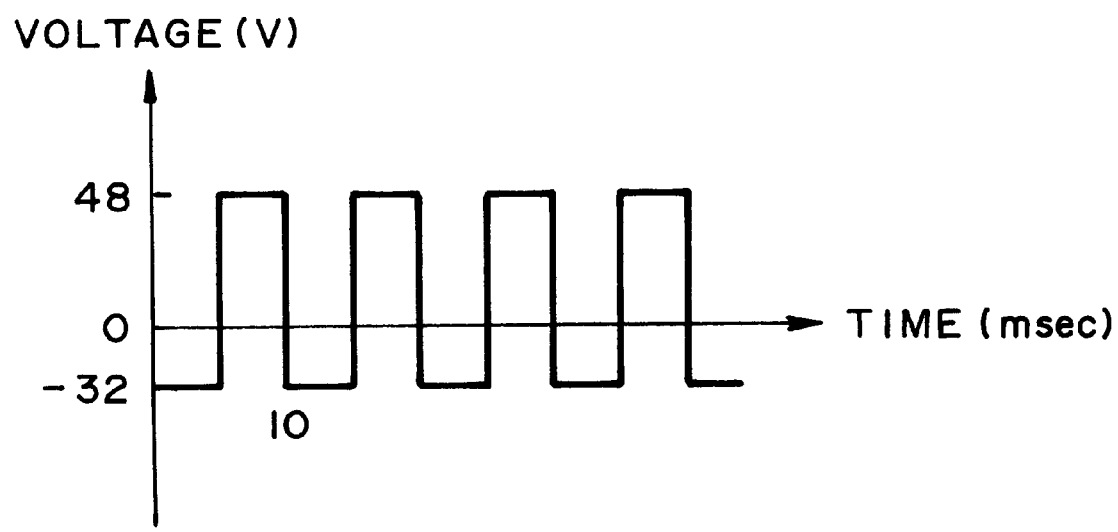

Then, an unbalanced rectangular alternating voltage shown in FIG. 20B including positive pulses of 48 volts and negative pulses of −32 volts was applied for 300 msec to the comb-shaped electrode 103b while grounding the counter electrode 103a, whereby the display device was brought to a dark state, which was memorized after the termination of the alternating voltage.

According to a similar microscopic observation, the polymer beads in the state of FIG. 21B were moved in directions opposite to the arrows in FIG. 21A to be dispersed between the opposing transparent electrodes 103a and 103b. The dispersed state was retained even after the termination of the alternating voltage thus showing a memory characteristic.

Figure 22:
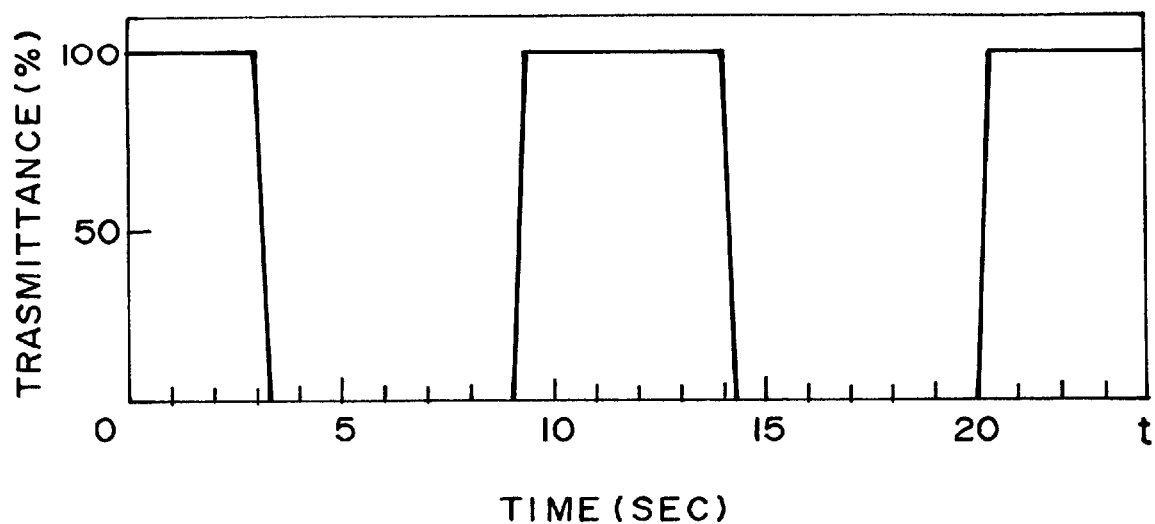
FIG. 22 shows an example of transmittance change obtained by alternately applying the signals of FIGS. 20A and 20B.

As described above, the alternating voltages shown in FIGS. 21A and 21B were alternately applied, the display device exhibited a bright state of transmittance=100% and a dark state of transmittance=0%, alternately, as shown in FIG. 22.

Thus, according to this example, a display having a memory state under no voltage application was realized.

EXAMPLE 7

Figure 23:
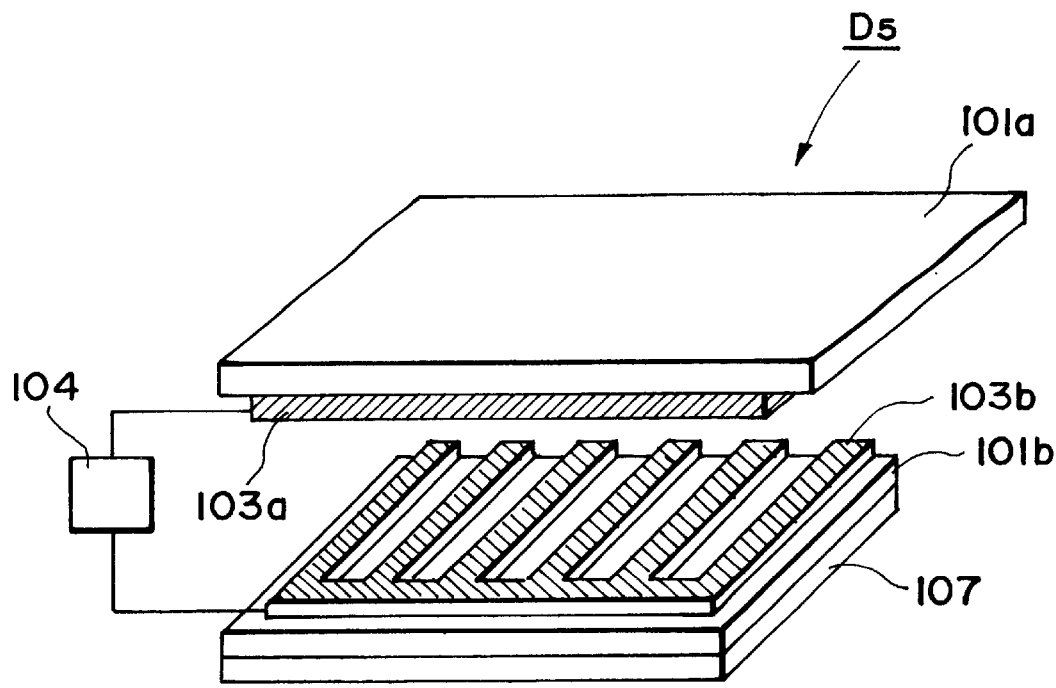
FIG. 23 is a perspective view for illustrating still another example display device.

A reflection-type display device D5 having a structure as illustrated in FIG. 23 was prepared in the same manner as in Example 6 except for inserting a white reflection plate 107 below (or behind) the lower transparent substrate 101b carrying the comb-shaped transparent electrode 103b thereon.

The display device was driven in the same manner as in Example 6. As a result of observation from the transparent electrode 101a side, a reflection-type display could be performed with a memory characteristic under no voltage application.

EXAMPLE 8

A transmission-type display device similar to the device D4 in Example 6 was prepared in the same manner as in Example 6 except that the polyimide film on the electrode 103a was not rubbed either (no rubbing to any polyimide film).

The display device was driven in the same manner as in Example 6 except that the alternating voltages of FIGS. 20A and 20B were respectively applied for longer periods of 350 msec instead of 300 msec.

As a result, a bright state and a dark state at similar levels as those in Example 6 were formed.

As a result of microscopic observation, the polymer beads moved not linearly but somewhat totteringly (irregular movement) under application of the alternating voltages due to no rubbing on the polyimide films. Such a tottering movement required a longer voltage application time.

EXAMPLE 9

The transmission-type display device D4 of Example 6 was driven in the following manner.

The device was initially placed in the bright state by application of an alternating voltage shown in FIG. 20A (time t=0), and then subjected to a succession of voltage application as follows (according time schedule indicated on the abscissa of FIG. 24).

Figure 25A:
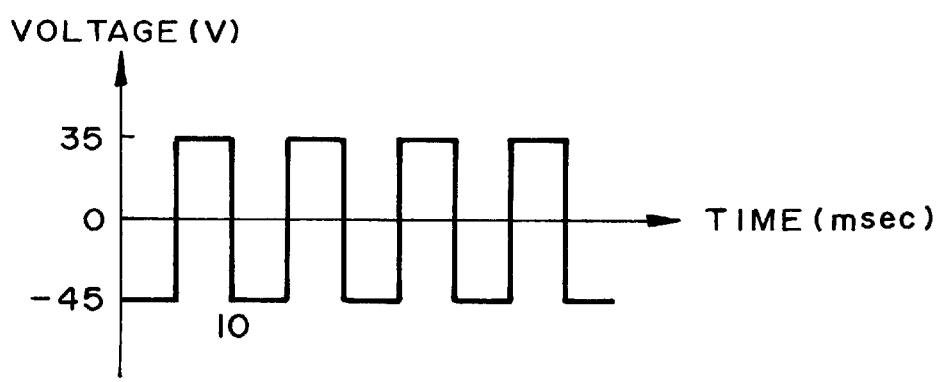
FIGS. 25A and 25B show drive signals used in Example 9.

(1) At time t=3 sec, an alternating voltage shown in FIG. 25A was applied for 150 msec.

Figure 25B:
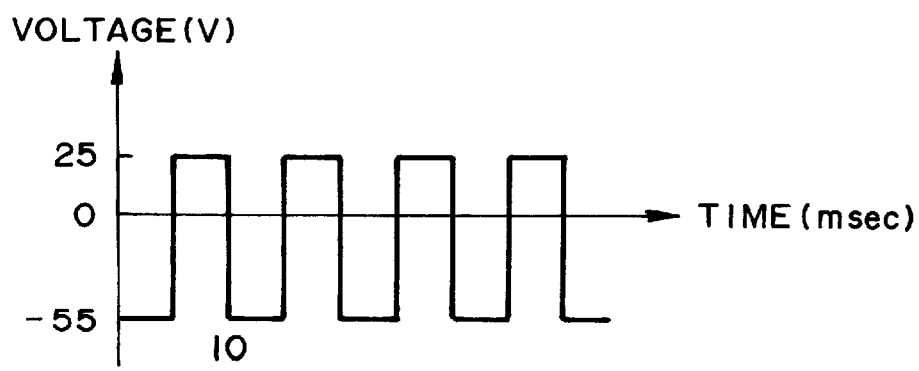

(2) At time t=7 sec, an alternating voltage shown in FIG. 25B was applied for 150 msec.

(3) At time t=11 sec, an alternating voltage shown in FIG. 20B was applied for 150 msec.

(4) At time t=17 sec, the alternating voltage shown in FIG. 20A was again applied for 300 msec.

All the alternating voltages were applied to the comb-shaped electrode 103b while grounding the counter electrode 103a.

Figure 24:
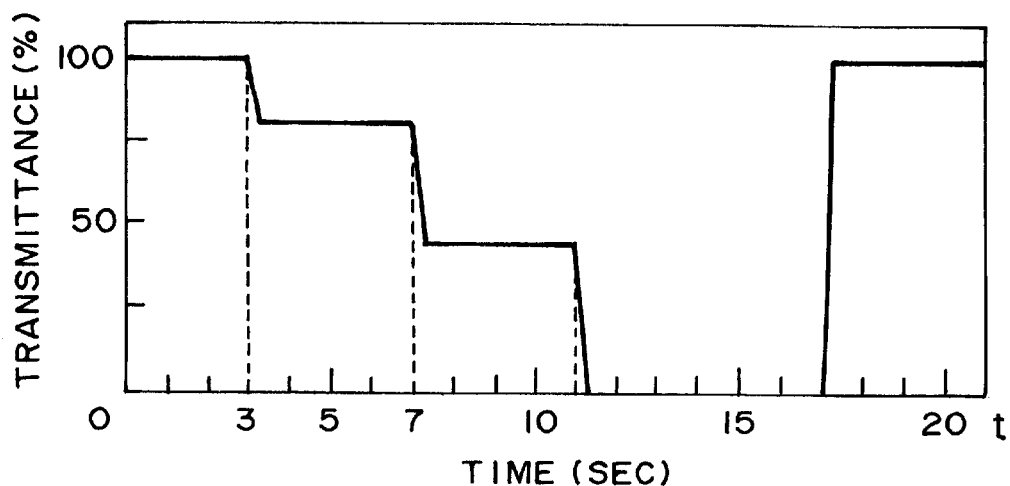
FIG. 24 is a graph showing an example of transmittance change obtained by driving the device of FIG. 23.

As a result of the above-mentioned successive application of alternating voltages, the display device exhibited a step-wise transmittance change as shown in FIG. 24, showing the possibility of a gradational display. Further, it was also confirmed that each transmittance level was retained during interruption of the voltage application.

As a result of microscopic observation, similar movements of the polymer beads as in the drive of Example 6 were observed. Further, it was confirmed that a higher transmittance was obtained at a lower dispersion density of the polymer beads between the opposing electrodes 103a and 103b.

EXAMPLE 10

A transmission-type display device was prepared in a similar manner as in Example 6 except that the opposing electrodes 103a and 103b were both formed in stripes so as to intersect each other at right angles and no rubbing was applied to the polyimide coating films on the electrodes 103a and 103b. The stripe electrodes 103a were formed at pitch of 100 μm and the stripe electrodes 103b were formed at a pitch of 80 μm with an electrode spacing of 50 μm for both electrodes 103a and 103b, thereby providing a pixel size of 5 mm×5 mm formed by a pair of opposing comb-shaped electrodes 103a and 103b.

The display device thus prepared having a 1t cell size of 1 cm×1 cm was driven by applying the alternating voltages shown in FIGS. 20A and 20B for an application period of 360 msec each, whereby a good display was obtained.

EXAMPLE 11

Figure 26:
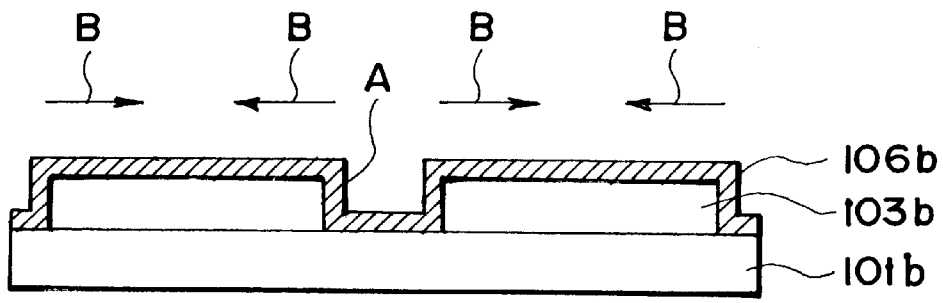
FIG. 26 illustrates an example of rubbing directions provided to a polyimide film on stripe electrodes.
Figure 27A:
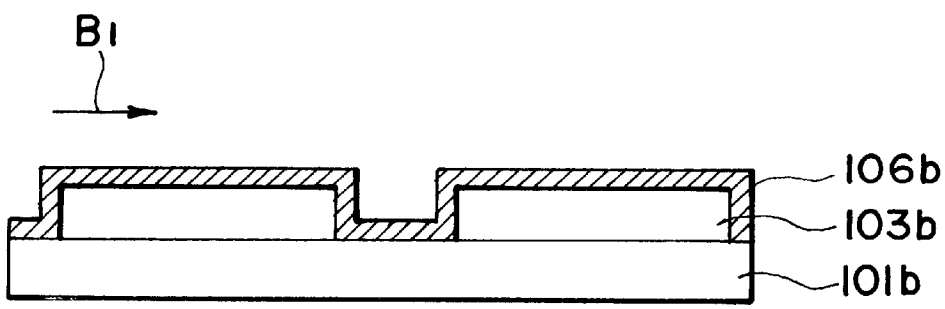
FIGS. 27A and 27B illustrate steps for providing the rubbing directions shown in FIG. 26.
Figure 27B:
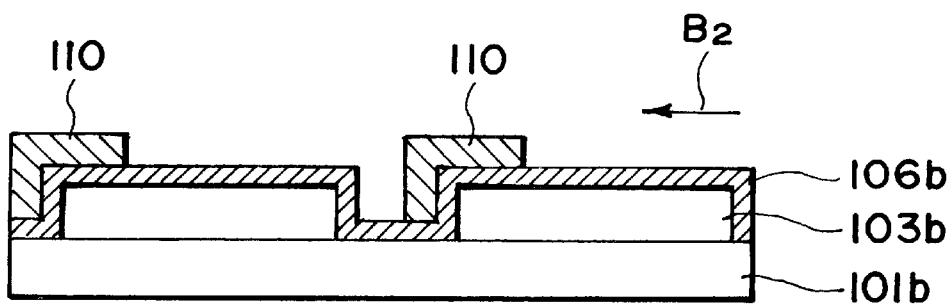

A display device was prepared in a similar manner as in Example 6 except that the polyimide film on the electrode 103a was not rubbed but the polyimide film 106b on the comb-shaped electrode 103b was rubbed in directions of arrows B in FIG. 26 by first rubbing the polyimide film 106b in a direction B1 as shown in FIG. 27A, then coating the polyimide film 106b with a photoresist patterned into a film 110 coating a half (left half) of each stripe electrode 103b and then rubbing the exposed portion of the polyimide film 106 in an opposite direction B2 as shown in FIG. 27B, followed by removal of the patterned resist 110.

The display device thus obtained was driven by applying the alternating voltages shown in FIGS. 20A and 20B for an application period of 290 msec each hereby a good display was obtained.

In the above-described embodiments and Examples, rectangular waveform voltages are used as single-polarity pulse voltages or unbalanced (i.e., DC component-retaining) alternating voltages for moving the minute solid particles. However, it is also possible to use voltages of other waveforms, such as triangular wave, saw-toothed wave and sinusoidal wave. Anyway, DC voltages are not effective, but periodic voltages (i.e., periodically changing voltages) having varying voltage levels and some frequency during the voltage application period are effective, for moving the minute solid particle. This is presumably because some drive force is applied to the minute solid particles when the applied voltage level is changed remarkably. In other words, the movement of the minute solid particles is related with the degree of applied voltage change.

As described above, according to the present invention, a display having a memory state under no voltage application can be realized, thus remarkably reducing the power consumption. Thus the present invention provides a display device capable of realizing a reversible transition between display states having different transmittances each having a memory characteristic by applying only electrical stimulation and also capable of a color display and a gradational display by a stepwise transmittance change.

What is claimed is:

1. A display device, comprising: a pair of oppositely disposed substrates each having an opposing electrode thereon so as to form a hollow cell including a gap between the electrodes, a mixture disposed to fill the hollow cell and comprising a low-molecular weight liquid crystal and minute solid particles having sizes smaller than the gap, and voltage application means for applying voltages between the opposing electrodes so as to selectively provide a state of localization and a state of dispersion of the minute solid particles between the oppositely disposed substrates thereby developing a transparent state and an opaque state, respectively, of the mixture.

2. A display device according to claim 1, wherein the electrode on at least one of the substrates is coated with a rubbed liquid crystal alignment film.

3. A display device according to claim 1, wherein the electrode on at least one of the substrates is coated with a liquid crystal alignment film.

4. A display device according to claim 2, wherein the electrodes on both substrates are coated with liquid crystal alignment films which have been rubbed in mutually reverse directions.

5. A display device according to claim 1, wherein said minute solid particles are insoluble in the liquid crystal at a temperature of an isotropic transition temperature of the liquid crystal or below.

6. A display device according to claim 1, wherein said low-molecular liquid crystal is a nematic liquid crystal.

7. A display device according to claim 6, wherein said nematic liquid crystal is a mixture liquid crystal comprising at least two species of low-molecular weight liquid crystals.

8. A display device according to claim 1, wherein said minute solid particles comprise an organic material.

9. A display device according to claim 1, wherein said minute solid particles comprise an inorganic material.

10. A display device according to claim 1, wherein said minute solid particles comprise a composite material of an organic material and an inorganic material.

11. A display device according to claim 1, wherein said minute solid particles are spherical.

12. A display device according to claim 1, wherein said minute solid particles are flat-shaped.

13. A display device according to claim 1, wherein said minute solid particles are acicular in shape.

14. A display device according to claim 1, wherein at least one of the substrates has been subjected to rubbing in one direction, and said voltage application means comprises means for applying a first input signal comprising a periodic voltage between the opposing electrodes for causing a first unidirectional movement of the minute solid particles between the opposing electrodes in a direction parallel to the rubbing direction to proximity to an edge of the opposing electrodes thereby forming the localized state of the minute solid particles, and applying a second input signal comprising a periodic voltage having a waveform different from that of the first input signal for causing a second unidirectional movement in a direction opposite to the first unidirectional movement and/or a random movement of the minute solid particles between the opposing electrodes thereby forming the dispersion state of the minute solid particles.

15. A display device according to claim 14, wherein said second input signal has a generally opposite polarity with respect to the first input signal.

16. A display device according to claim 14, wherein said periodic voltage comprise a rectangular waveform.

17. A display device according to claim 16, wherein said periodic voltage comprise an unbalanced alternating voltage including positive and negative voltages.

18. A display device according to claim 17, wherein said first input signal comprises a positive net voltage for causing the first unidirectional movement in one direction of the minute solid particles, and said second input signal comprises a negative net voltage for causing the second unidirectional movement in the opposite direction of the minute solid particles.

19. A display device according to claim 14, wherein said periodic voltage for causing the first unidirectional movement or the second unidirectional movement of the minute solid particles has a frequency of 90 Hz to 10 kHz and an amplitude suitable for providing an electric field intensity of at least 1 volt/$\mu$m.

20. A display device according to claim 14, wherein said periodic voltage for causing the random movement of the minute solid particles has a frequency of 1 to 80 Hz and an amplitude suitable for providing an electric field intensity of at least 1 volt/$\mu$m.

21. A display device according to claim 1, wherein said minute solid particles comprise crystals of organic molecule.

22. A display device according to claim 21, wherein said organic molecule has at least one intermolecular interaction site.

23. A display device according to claim 22, wherein the intermolecular interaction is given as a hydrogen bond.

24. A display device according to claim 22, wherein said intermolecular interaction site comprises an amide group.

25. A display device according to claim 21, wherein said organic molecule has a mesomorphic residue.

26. A display device according to claim 25, wherein said mesomorphic residue is a nematic mesomorphic residue.

27. A display device according to claim 26, wherein the organic molecule having a nematic mesomorphic residue has a structure represented by formula (1) below:

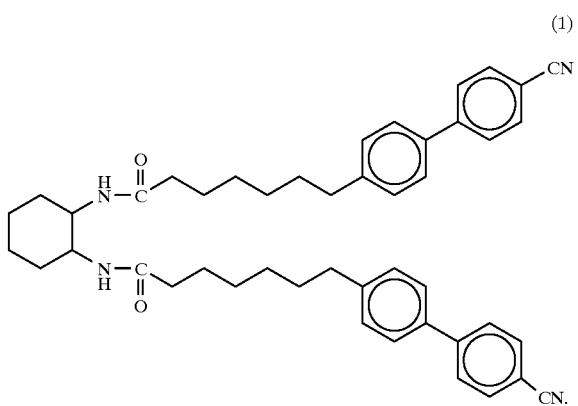

(1)

28. A display device according to claim 1, wherein the minute solid particles have an organic molecular bonded to their surface.

29. A display device according to claim 28, wherein the organic molecule is bonded by a covalent bond.

30. A display device according to claim 29, wherein the organic molecule is bonded by an amide bond.

31. A display device according to claim 28, wherein the organic molecule is bonded by a non-covalent bond.

32. A display device according to claim 28, wherein the organic molecule is bonded by an electrostatic bond.

33. A display device according to claim 28, wherein said organic molecule comprises a mesomorphic residue group.

34. A display device according to claim 33, wherein said mesomorphic residue group is a nematic mesomorphic residue group.

35. A display device according to claim 1, wherein at least one of said opposing electrodes is formed in stripes.

36. A display device according to claim 1, wherein said minute solid particles have been colored.

37. A display device according to claim 1, wherein said minute solid particles have been colored in black.

38. A display device according to claim 35, wherein both of said organic molecules are formed in stripes disposed so as to intersect each other at right angles.

39. A display device according to claim 35, wherein both of said organic electrodes are formed in stripes and arranged at mutually different pitches.

40. A display device according to claim 1, which is of a transmission-type.

41. A display device according to claim 1, which is of a reflection type.

42. A display device according to claim 35, wherein said minute solid particles in the localized state are localized at concavities formed corresponding to spacings between the stripe electrodes, and said minute solid particle in the dispersion state are dispersed over the stripe electrodes and spacings therebetween.

* * * * *

UNITED STATES PATENT AND TRADEMARK OFFICE
CERTIFICATE OF CORRECTION

PATENT NO. : 6,259,498 B1
DATED : July 10, 2001
INVENTOR(S) : Toshihiko Takeda

Page 1 of 1

It is certified that error appears in the above-identified patent and that said Letters Patent is hereby corrected as shown below:

Column 4,
Line 46, "particle" should read -- particles --.

Column 9,
Line 41, "particles of minute polarity" should read -- plurality of minute particles --.

Column 14,
Line 15, "and/50" should read -- and 50 --.

Column 17,
Line 3, "+15.5," should read -- +15.5), --.
Line 13, "prepared." should read -- prepared --.

Column 19,
Line 3, "It" should be deleted.

Column 22,
Line 32, "particle" should read -- particles --.

Signed and Sealed this

Twenty-sixth Day of February, 2002

*Attest:*

JAMES E. ROGAN
*Attesting Officer*     *Director of the United States Patent and Trademark Office*